United States Patent
Bradfield

(10) Patent No.: US 9,614,772 B1
(45) Date of Patent: Apr. 4, 2017

(54) SYSTEM AND METHOD FOR DIRECTING NETWORK TRAFFIC IN TUNNELING APPLICATIONS

(75) Inventor: Christopher James Bradfield, Seattle, WA (US)

(73) Assignee: F5 Networks, Inc., Seattle, WA (US)

(*) Notice: Subject to any disclaimer, the term of this patent is extended or adjusted under 35 U.S.C. 154(b) by 902 days.

(21) Appl. No.: 10/719,375

(22) Filed: Nov. 21, 2003

Related U.S. Application Data

(60) Provisional application No. 60/512,977, filed on Oct. 20, 2003.

(51) Int. Cl.
| | |
|---|---|
| *G06F 15/173* | (2006.01) |
| *H04L 12/851* | (2013.01) |
| *G06F 15/16* | (2006.01) |
| *G06F 3/00* | (2006.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/857* | (2013.01) |

(52) U.S. Cl.
CPC ...... *H04L 47/2441* (2013.01); *H04L 47/2491* (2013.01)

(58) Field of Classification Search
CPC .................................................. H04L 47/2441
USPC .......... 709/238, 232, 233, 234, 235; 710/29; 370/229, 230, 231, 232, 233, 234, 235
See application file for complete search history.

(56) References Cited

U.S. PATENT DOCUMENTS

| | | |
|---|---|---|
| 3,689,872 A | 9/1972 | Sieracki |
| 3,768,726 A | 10/1973 | Hale et al. |
| 4,021,782 A | 5/1977 | Hoerning |
| 4,054,951 A | 10/1977 | Jackson et al. |
| 4,316,222 A | 2/1982 | Subramaniam et al. |
| 4,386,416 A | 5/1983 | Giltner et al. |
| 4,593,324 A | 6/1986 | Ohkubo et al. |
| 4,626,829 A | 12/1986 | Hauck |

(Continued)

OTHER PUBLICATIONS

Session Initiation Protocol, http://en.wikipedia.org/w/index.php?title=Session_Initiation_Protoc . . . , accessed May 14, 2008, 5 pgs.

(Continued)

*Primary Examiner* — Krista Zele
*Assistant Examiner* — Tariq Najee-Ullah
(74) *Attorney, Agent, or Firm* — John W. Branch; Lowe Graham Jones PLLC

(57) ABSTRACT

A method, apparatus, and system are directed to managing traffic towards a tunnel in a network. The invention enables a network device, to extract data from a received packet. A deep packet inspection is employed that enables examination of the extracted data at virtually any layer of an OSI layered protocol of the packet. If the extracted data does not satisfy the flow criteria, a second packet may be inspected at a deep packet level to determine whether the data of the first and second packet satisfies the flow criteria. If the extracted data satisfies the flow criteria a tunnel is determined based, in part, on the flow criteria. The packet is associated with and forwarded towards the determined tunnel.

43 Claims, 5 Drawing Sheets

(56) References Cited

U.S. PATENT DOCUMENTS

| | | | |
|---|---|---|---|
| 4,701,745 A | 10/1987 | Waterworth et al. | |
| 4,747,050 A | 5/1988 | Brachtl | |
| 4,862,167 A | 8/1989 | Copeland, III | |
| 4,876,541 A | 10/1989 | Storer | |
| 4,890,282 A | 12/1989 | Lambert et al. | |
| 4,897,717 A | 1/1990 | Hamilton et al. | |
| 4,906,991 A | 3/1990 | Fiala et al. | |
| 4,971,407 A | 11/1990 | Hoffman | |
| 4,988,998 A | 1/1991 | O'Brien | |
| 5,003,307 A | 3/1991 | Whiting et al. | |
| 5,016,009 A | 5/1991 | Whiting et al. | |
| 5,063,523 A | 11/1991 | Vrenjak | |
| 5,109,433 A | 4/1992 | Notenboom | |
| 5,126,739 A | 6/1992 | Whiting et al. | |
| 5,146,221 A | 9/1992 | Whiting et al. | |
| 5,150,430 A | 9/1992 | Chu | |
| 5,155,484 A | 10/1992 | Chambers, IV | |
| 5,167,034 A | 11/1992 | MacLean, Jr. et al. | |
| 5,212,742 A | 5/1993 | Normile et al. | |
| 5,249,053 A | 9/1993 | Jain | |
| 5,276,444 A | 1/1994 | McNair | |
| 5,280,600 A | 1/1994 | Van Maren et al. | |
| 5,293,388 A | 3/1994 | Monroe et al. | |
| 5,319,638 A | 6/1994 | Lin | |
| 5,341,440 A | 8/1994 | Earl et al. | |
| 5,367,629 A | 11/1994 | Chu et al. | |
| 5,379,036 A | 1/1995 | Storer | |
| 5,410,671 A | 4/1995 | Elgamal et al. | |
| 5,414,425 A | 5/1995 | Whiting et al. | |
| 5,463,390 A | 10/1995 | Whiting et al. | |
| 5,479,587 A | 12/1995 | Campbell et al. | |
| 5,481,720 A | 1/1996 | Loucks et al. | |
| 5,488,364 A | 1/1996 | Cole | |
| 5,504,842 A | 4/1996 | Gentile | |
| 5,506,944 A | 4/1996 | Gentile | |
| 5,511,122 A | 4/1996 | Atkinson | |
| 5,539,865 A | 7/1996 | Gentile | |
| 5,542,031 A | 7/1996 | Douglass et al. | |
| 5,544,290 A | 8/1996 | Gentile | |
| 5,546,395 A | 8/1996 | Sharma et al. | |
| 5,546,475 A | 8/1996 | Bolle et al. | |
| 5,553,160 A | 9/1996 | Dawson | |
| 5,553,242 A | 9/1996 | Russell et al. | |
| 5,610,905 A | 3/1997 | Murthy et al. | |
| 5,615,287 A | 3/1997 | Fu et al. | |
| 5,638,498 A | 6/1997 | Tyler et al. | |
| 5,749,053 A | 5/1998 | Kusaki et al. | |
| 5,768,445 A | 6/1998 | Troeller et al. | |
| 5,768,525 A | 6/1998 | Kralowetz et al. | |
| 5,774,715 A | 6/1998 | Madany et al. | |
| 5,805,932 A | 9/1998 | Kawashima et al. | |
| 5,825,890 A | 10/1998 | Elgamal et al. | |
| 5,850,565 A | 12/1998 | Wightman et al. | |
| 5,874,907 A | 2/1999 | Craft | |
| 5,884,269 A | 3/1999 | Cellier et al. | |
| 5,892,847 A | 4/1999 | Johnson | |
| 5,898,837 A | 4/1999 | Guttman et al. | |
| 5,941,988 A | 8/1999 | Bhagwat et al. | |
| 5,951,623 A | 9/1999 | Reynar et al. | |
| 5,991,515 A | 11/1999 | Fall et al. | |
| 5,991,881 A | 11/1999 | Conklin et al. | |
| 6,006,264 A * | 12/1999 | Colby | H04L 12/5695 709/220 |
| 6,023,722 A | 2/2000 | Colyer | |
| 6,052,785 A | 4/2000 | Lin et al. | |
| 6,061,454 A | 5/2000 | malik et al. | |
| 6,070,179 A | 5/2000 | Craft | |
| 6,078,957 A * | 6/2000 | Adelman | H04L 29/12009 709/224 |
| 6,088,451 A | 7/2000 | He et al. | |
| 6,105,133 A | 8/2000 | Fielder et al. | |
| 6,170,057 B1 | 1/2001 | Inoue et al. | |
| 6,182,139 B1 | 1/2001 | Brendel | |
| 6,185,221 B1 | 2/2001 | Aybay | |
| 6,223,287 B1 | 4/2001 | Douglas et al. | |
| 6,226,687 B1 | 5/2001 | Harriman et al. | |
| 6,253,226 B1 | 6/2001 | Chidambaran et al. | |
| 6,286,052 B1 * | 9/2001 | McCloghrie | H04L 12/5695 370/235 |
| 6,298,380 B1 | 10/2001 | Coile et al. | |
| 6,367,009 B1 | 4/2002 | Davis et al. | |
| 6,370,584 B1 | 4/2002 | Bestavros et al. | |
| 6,393,465 B2 | 5/2002 | Leeds | |
| 6,411,986 B1 | 6/2002 | Susai et al. | |
| 6,434,618 B1 | 8/2002 | Cohen et al. | |
| 6,434,624 B1 * | 8/2002 | Gai | H04L 12/5695 370/235 |
| 6,446,204 B1 | 9/2002 | Pang et al. | |
| 6,452,915 B1 * | 9/2002 | Jorgensen | 370/338 |
| 6,463,470 B1 * | 10/2002 | Mohaban | H04L 12/5695 709/223 |
| 6,463,474 B1 | 10/2002 | Fuh et al. | |
| 6,466,984 B1 * | 10/2002 | Naveh | H04L 47/10 370/229 |
| 6,567,408 B1 * | 5/2003 | Li | H04L 12/5601 370/395.31 |
| 6,584,567 B1 | 6/2003 | Bellwood et al. | |
| 6,590,588 B2 * | 7/2003 | Lincke et al. | 715/744 |
| 6,590,885 B1 * | 7/2003 | Jorgensen | 370/338 |
| 6,594,246 B1 * | 7/2003 | Jorgensen | 370/338 |
| 6,598,034 B1 * | 7/2003 | Kloth | H04L 12/2602 370/338 |
| 6,625,150 B1 * | 9/2003 | Yu | 370/389 |
| 6,628,629 B1 * | 9/2003 | Jorgensen | 370/322 |
| 6,629,163 B1 | 9/2003 | Balassanian | |
| 6,633,835 B1 * | 10/2003 | Moran et al. | 702/190 |
| 6,643,259 B1 | 11/2003 | Borella et al. | |
| 6,643,701 B1 | 11/2003 | Aziz et al. | |
| 6,650,640 B1 | 11/2003 | Muller et al. | |
| 6,651,101 B1 * | 11/2003 | Gai | H04L 12/5695 709/224 |
| 6,654,701 B2 | 11/2003 | Hatley | |
| 6,665,725 B1 * | 12/2003 | Dietz et al. | 709/230 |
| 6,668,327 B1 | 12/2003 | Prabandham et al. | |
| 6,674,717 B1 | 1/2004 | Duong-van et al. | |
| 6,681,327 B1 | 1/2004 | Jardin | |
| 6,697,363 B1 | 2/2004 | Carr | |
| 6,704,789 B1 | 3/2004 | Ala-Laurila et al. | |
| 6,718,388 B1 | 4/2004 | Yarborough et al. | |
| 6,754,662 B1 | 6/2004 | Li | |
| 6,754,831 B2 * | 6/2004 | Brownell | 726/15 |
| 6,760,782 B1 | 7/2004 | Swales | |
| 6,763,384 B1 * | 7/2004 | Gupta et al. | 709/224 |
| 6,766,373 B1 | 7/2004 | Beadle et al. | |
| 6,768,716 B1 | 7/2004 | Abel et al. | |
| 6,768,726 B2 * | 7/2004 | Dorenbosch et al. | 370/331 |
| 6,789,203 B1 | 9/2004 | Belissent | |
| 6,792,461 B1 * | 9/2004 | Hericourt | 709/225 |
| 6,798,743 B1 * | 9/2004 | Ma et al. | 370/235 |
| 6,799,276 B1 | 9/2004 | Belissent | |
| 6,829,238 B2 | 12/2004 | Tokuyo et al. | |
| 6,831,923 B1 | 12/2004 | Laor et al. | |
| 6,842,462 B1 * | 1/2005 | Ramjee et al. | 370/466 |
| 6,842,860 B1 | 1/2005 | Branstad et al. | |
| 6,845,449 B1 | 1/2005 | Carman et al. | |
| 6,853,988 B1 | 2/2005 | Dickinson et al. | |
| 6,854,117 B1 | 2/2005 | Roberts | |
| 6,895,443 B2 | 5/2005 | Aiken | |
| 6,915,426 B1 | 7/2005 | Carman et al. | |
| 6,928,082 B2 | 8/2005 | Liu et al. | |
| 6,934,260 B1 | 8/2005 | Kanuri | |
| 6,934,848 B1 | 8/2005 | King et al. | |
| 6,950,434 B1 | 9/2005 | Viswanath et al. | |
| 6,954,462 B1 * | 10/2005 | Chu et al. | 370/400 |
| 6,954,780 B2 | 10/2005 | Susai et al. | |
| 6,957,272 B2 | 10/2005 | Tallegas et al. | |
| 6,976,168 B1 | 12/2005 | Branstad et al. | |
| 6,990,592 B2 | 1/2006 | Richmond et al. | |
| 7,010,690 B1 | 3/2006 | Hanna et al. | |
| 7,010,691 B2 | 3/2006 | Wheeler et al. | |
| 7,013,338 B1 | 3/2006 | Nag et al. | |
| 7,013,342 B2 * | 3/2006 | Riddle | 709/230 |
| 7,023,804 B1 | 4/2006 | Younes et al. | |
| 7,047,315 B1 | 5/2006 | Srivastava | |

(56) References Cited

U.S. PATENT DOCUMENTS

| | | | |
|---|---|---|---|
| 7,051,330 B1 | 5/2006 | Kaler et al. | |
| 7,068,640 B2 | 6/2006 | Kakemizu et al. | |
| 7,069,438 B2 | 6/2006 | Balabine et al. | |
| 7,092,727 B1 | 8/2006 | Li et al. | |
| 7,103,045 B2 | 9/2006 | Lavigne et al. | |
| 7,113,993 B1 | 9/2006 | Cappiello et al. | |
| 7,116,668 B2 | 10/2006 | Sivalingham | |
| 7,127,524 B1 | 10/2006 | Renda et al. | |
| 7,139,792 B1 | 11/2006 | Mishra et al. | |
| 7,139,811 B2 | 11/2006 | Lev Ran et al. | |
| 7,177,311 B1* | 2/2007 | Hussain et al. | 370/392 |
| 7,181,493 B2 | 2/2007 | English et al. | |
| 7,185,360 B1 | 2/2007 | Anton et al. | |
| 7,187,771 B1 | 3/2007 | Dickinson et al. | |
| 7,215,637 B1 | 5/2007 | Ferguson et al. | |
| 7,231,445 B1 | 6/2007 | Aweya et al. | |
| 7,231,657 B2 | 6/2007 | Honarvar et al. | |
| 7,251,218 B2* | 7/2007 | Jorgensen | 370/235 |
| 7,254,639 B1 | 8/2007 | Siegel et al. | |
| 7,260,724 B1 | 8/2007 | Dickinson et al. | |
| 7,266,613 B1 | 9/2007 | Brown et al. | |
| 7,272,651 B1 | 9/2007 | Bolding et al. | |
| 7,280,471 B2* | 10/2007 | Rajagopal et al. | 370/230 |
| 7,287,077 B2 | 10/2007 | Haugh et al. | |
| 7,287,082 B1 | 10/2007 | O'Toole, Jr. | |
| 7,313,627 B1 | 12/2007 | Noble | |
| 7,315,513 B2 | 1/2008 | McCann et al. | |
| 7,321,926 B1 | 1/2008 | Zhang et al. | |
| 7,324,447 B1* | 1/2008 | Morford | 370/231 |
| 7,350,229 B1 | 3/2008 | Lander | |
| 7,359,974 B1* | 4/2008 | Quinn et al. | 709/228 |
| 7,362,762 B2 | 4/2008 | Williams, Jr. et al. | |
| 7,366,755 B1 | 4/2008 | Cuomo et al. | |
| 7,409,450 B2* | 8/2008 | Jorgensen | 709/226 |
| 7,421,515 B2 | 9/2008 | Marovich | |
| 7,463,637 B2 | 12/2008 | Bou-Diab et al. | |
| 7,484,011 B1 | 1/2009 | Agasaveeran et al. | |
| 7,496,750 B2 | 2/2009 | Kumar et al. | |
| 7,571,313 B2 | 8/2009 | Messerges et al. | |
| 7,586,851 B2 | 9/2009 | Panigrahy et al. | |
| 7,596,137 B2 | 9/2009 | Bennett | |
| 7,599,283 B1* | 10/2009 | Varier et al. | 370/216 |
| 7,619,983 B2 | 11/2009 | Panigrahy | |
| 7,623,468 B2 | 11/2009 | Panigrahy et al. | |
| 7,624,436 B2 | 11/2009 | Balakrishnan et al. | |
| 7,706,778 B2 | 4/2010 | Lowe | |
| 7,711,857 B2 | 5/2010 | Balassanian | |
| 7,721,084 B2* | 5/2010 | Salminen et al. | 713/150 |
| 7,876,704 B1 | 1/2011 | Bims et al. | |
| 7,953,974 B2 | 5/2011 | Yamamura et al. | |
| 8,009,566 B2 | 8/2011 | Zuk et al. | |
| 8,027,637 B1 | 9/2011 | Bims | |
| 8,270,413 B2* | 9/2012 | Weill et al. | 370/395.53 |
| 8,412,778 B2 | 4/2013 | Leeds | |
| 8,584,131 B2 | 11/2013 | Wong et al. | |
| 9,294,444 B2 | 3/2016 | O'Hare et al. | |
| 2001/0032254 A1* | 10/2001 | Hawkins | 709/219 |
| 2001/0049741 A1 | 12/2001 | Skene et al. | |
| 2001/0049785 A1 | 12/2001 | Kawan et al. | |
| 2002/0016777 A1 | 2/2002 | Seamons et al. | |
| 2002/0025036 A1 | 2/2002 | Sato | |
| 2002/0054567 A1* | 5/2002 | Fan | 370/230 |
| 2002/0055980 A1 | 5/2002 | Goddard | |
| 2002/0057678 A1 | 5/2002 | Jiang et al. | |
| 2002/0059428 A1 | 5/2002 | Susai et al. | |
| 2002/0073223 A1 | 6/2002 | Darnell et al. | |
| 2002/0076054 A1 | 6/2002 | Fukutomi et al. | |
| 2002/0085587 A1 | 7/2002 | Mascolo | |
| 2002/0103663 A1 | 8/2002 | Bankier et al. | |
| 2002/0107903 A1 | 8/2002 | Richter et al. | |
| 2002/0116646 A1 | 8/2002 | Mont et al. | |
| 2002/0116647 A1 | 8/2002 | Mont et al. | |
| 2002/0126671 A1 | 9/2002 | Ellis et al. | |
| 2002/0133586 A1 | 9/2002 | Shanklin et al. | |
| 2002/0141393 A1* | 10/2002 | Eriksson et al. | 370/352 |
| 2002/0144149 A1 | 10/2002 | Hanna et al. | |
| 2002/0147916 A1 | 10/2002 | Strongin et al. | |
| 2002/0169980 A1* | 11/2002 | Brownell | 713/201 |
| 2003/0018827 A1 | 1/2003 | Guthrie et al. | |
| 2003/0043755 A1 | 3/2003 | Mitchell | |
| 2003/0050974 A1 | 3/2003 | Mani-Meitav et al. | |
| 2003/0061256 A1 | 3/2003 | Mathews et al. | |
| 2003/0069973 A1* | 4/2003 | Ganesan et al. | 709/226 |
| 2003/0097460 A1* | 5/2003 | Higashiyama et al. | 709/232 |
| 2003/0097484 A1* | 5/2003 | Bahl | 709/313 |
| 2003/0097593 A1 | 5/2003 | Sawa et al. | |
| 2003/0103466 A1* | 6/2003 | McCann et al. | 370/252 |
| 2003/0110230 A1 | 6/2003 | Holdsworth et al. | |
| 2003/0112755 A1* | 6/2003 | McDysan | 370/230 |
| 2003/0123447 A1* | 7/2003 | Smith | 370/394 |
| 2003/0126029 A1 | 7/2003 | Dastidar et al. | |
| 2003/0126437 A1 | 7/2003 | Wheeler et al. | |
| 2003/0126439 A1 | 7/2003 | Wheeler et al. | |
| 2003/0139183 A1* | 7/2003 | Rantalainen | 455/435 |
| 2003/0140230 A1 | 7/2003 | de Jong et al. | |
| 2003/0154406 A1 | 8/2003 | Honarvar et al. | |
| 2003/0169859 A1* | 9/2003 | Strathmeyer et al. | 379/88.17 |
| 2003/0172090 A1 | 9/2003 | Asunmaa et al. | |
| 2003/0172164 A1 | 9/2003 | Coughlin | |
| 2003/0177267 A1* | 9/2003 | Orava et al. | 709/245 |
| 2003/0179738 A1 | 9/2003 | Diachina et al. | |
| 2003/0200433 A1 | 10/2003 | Stirbu | |
| 2003/0214948 A1* | 11/2003 | Jin et al. | 370/392 |
| 2003/0217171 A1 | 11/2003 | Von Stuermer et al. | |
| 2003/0223413 A1 | 12/2003 | Guerrero | |
| 2003/0235204 A1 | 12/2003 | Azevedo et al. | |
| 2004/0004975 A1 | 1/2004 | Shin et al. | |
| 2004/0006638 A1 | 1/2004 | Oberlander et al. | |
| 2004/0008629 A1* | 1/2004 | Rajagopal et al. | 370/239 |
| 2004/0008664 A1* | 1/2004 | Takahashi et al. | 370/351 |
| 2004/0008728 A1* | 1/2004 | Lee | 370/474 |
| 2004/0010473 A1* | 1/2004 | Hsu et al. | 705/77 |
| 2004/0015686 A1* | 1/2004 | Connor et al. | 713/150 |
| 2004/0017796 A1* | 1/2004 | Lemieux et al. | 370/349 |
| 2004/0034773 A1 | 2/2004 | Balabine et al. | |
| 2004/0037322 A1 | 2/2004 | Sukonik et al. | |
| 2004/0049687 A1 | 3/2004 | Orsini et al. | |
| 2004/0052257 A1* | 3/2004 | Abdo et al. | 370/392 |
| 2004/0078491 A1 | 4/2004 | Gormish et al. | |
| 2004/0083394 A1 | 4/2004 | Brebner et al. | |
| 2004/0088585 A1 | 5/2004 | Kaler et al. | |
| 2004/0095934 A1* | 5/2004 | Cheng et al. | 370/390 |
| 2004/0098619 A1 | 5/2004 | Shay | |
| 2004/0098620 A1 | 5/2004 | Shay | |
| 2004/0107360 A1 | 6/2004 | Herrmann et al. | |
| 2004/0107364 A1 | 6/2004 | Shin | |
| 2004/0148425 A1* | 7/2004 | Haumont et al. | 709/236 |
| 2004/0167984 A1 | 8/2004 | Herrmann | |
| 2004/0177276 A1 | 9/2004 | MacKinnon et al. | |
| 2004/0193513 A1* | 9/2004 | Pruss et al. | 705/30 |
| 2004/0218603 A1* | 11/2004 | Lee et al. | 370/390 |
| 2004/0225810 A1 | 11/2004 | Hiratsuka | |
| 2004/0225880 A1 | 11/2004 | Mizrah | |
| 2004/0228360 A1 | 11/2004 | Bae et al. | |
| 2004/0230695 A1* | 11/2004 | Anschutz et al. | 709/232 |
| 2004/0240446 A1* | 12/2004 | Compton | 370/389 |
| 2004/0255243 A1 | 12/2004 | Vincent | |
| 2004/0260657 A1 | 12/2004 | Cockerham | |
| 2004/0260745 A1 | 12/2004 | Gage et al. | |
| 2004/0268152 A1 | 12/2004 | Xia et al. | |
| 2005/0015594 A1 | 1/2005 | Ashley et al. | |
| 2005/0021957 A1 | 1/2005 | Gu | |
| 2005/0021982 A1 | 1/2005 | Popp et al. | |
| 2005/0049934 A1 | 3/2005 | Kakayama et al. | |
| 2005/0060295 A1 | 3/2005 | Gould et al. | |
| 2005/0063303 A1 | 3/2005 | Samuels et al. | |
| 2005/0063307 A1 | 3/2005 | Samuels et al. | |
| 2005/0071643 A1 | 3/2005 | Moghe | |
| 2005/0074007 A1 | 4/2005 | Samuels et al. | |
| 2005/0091513 A1 | 4/2005 | Mitomo et al. | |
| 2005/0108420 A1 | 5/2005 | Brown et al. | |
| 2005/0114700 A1* | 5/2005 | Barrie et al. | 713/201 |
| 2005/0125692 A1 | 6/2005 | Cox et al. | |
| 2005/0132060 A1 | 6/2005 | Mo et al. | |

(56) References Cited

U.S. PATENT DOCUMENTS

| | | | |
|---|---|---|---|
| 2005/0135436 | A1 | 6/2005 | Nigam et al. |
| 2005/0144278 | A1 | 6/2005 | Atamaniouk |
| 2005/0154914 | A1 | 7/2005 | Eguchi et al. |
| 2005/0160289 | A1 | 7/2005 | Shay |
| 2005/0171930 | A1 | 8/2005 | Arning et al. |
| 2005/0177724 | A1 | 8/2005 | Ali et al. |
| 2005/0187979 | A1 | 8/2005 | Christensen et al. |
| 2005/0193208 | A1 | 9/2005 | Charrette et al. |
| 2005/0193211 | A1 | 9/2005 | Kurose |
| 2005/0203988 | A1* | 9/2005 | Nollet et al. ........... 709/201 |
| 2005/0216555 | A1 | 9/2005 | English et al. |
| 2005/0238010 | A1 | 10/2005 | Panigrahy et al. |
| 2005/0238011 | A1 | 10/2005 | Panigrahy |
| 2005/0238012 | A1 | 10/2005 | Panigrahy et al. |
| 2005/0238022 | A1 | 10/2005 | Panigrahy |
| 2005/0265235 | A1 | 12/2005 | Accapadi et al. |
| 2005/0271048 | A1 | 12/2005 | Casey |
| 2005/0278775 | A1 | 12/2005 | Ross |
| 2005/0286516 | A1 | 12/2005 | Sundaresan et al. |
| 2006/0005008 | A1 | 1/2006 | Kao |
| 2006/0020598 | A1 | 1/2006 | Shoolman et al. |
| 2006/0026290 | A1 | 2/2006 | Pulito et al. |
| 2006/0029062 | A1 | 2/2006 | Rao et al. |
| 2006/0029063 | A1 | 2/2006 | Rao et al. |
| 2006/0029064 | A1 | 2/2006 | Rao et al. |
| 2006/0036747 | A1 | 2/2006 | Galvin et al. |
| 2006/0037071 | A1 | 2/2006 | Rao et al. |
| 2006/0041507 | A1 | 2/2006 | Novack et al. |
| 2006/0056443 | A1 | 3/2006 | Tao et al. |
| 2006/0062228 | A1 | 3/2006 | Ota et al. |
| 2006/0089994 | A1 | 4/2006 | Hayes |
| 2006/0123226 | A1 | 6/2006 | Kumar et al. |
| 2006/0153228 | A1* | 7/2006 | Stahl et al. ........... 370/466 |
| 2006/0161667 | A1 | 7/2006 | Umesawa et al. |
| 2006/0174037 | A1 | 8/2006 | Bernardi et al. |
| 2006/0174332 | A1 | 8/2006 | Bauban et al. |
| 2006/0177061 | A1 | 8/2006 | Orsini et al. |
| 2006/0200855 | A1 | 9/2006 | Willis |
| 2006/0227802 | A1 | 10/2006 | Du et al. |
| 2006/0233166 | A1 | 10/2006 | Bou-Diab et al. |
| 2006/0235973 | A1 | 10/2006 | McBride et al. |
| 2006/0239503 | A1 | 10/2006 | Petrovic et al. |
| 2006/0242300 | A1 | 10/2006 | Yumoto et al. |
| 2006/0242688 | A1 | 10/2006 | Paramasivam et al. |
| 2006/0265689 | A1* | 11/2006 | Kuznetsov et al. ....... 717/117 |
| 2006/0276196 | A1 | 12/2006 | Jiang et al. |
| 2006/0288404 | A1 | 12/2006 | Krishnan et al. |
| 2006/0291402 | A1 | 12/2006 | Yun et al. |
| 2006/0294366 | A1 | 12/2006 | Nadalin et al. |
| 2007/0094336 | A1 | 4/2007 | Pearson |
| 2007/0094714 | A1 | 4/2007 | Bauban et al. |
| 2007/0121615 | A1* | 5/2007 | Weill et al. ........... 370/389 |
| 2007/0153798 | A1* | 7/2007 | Krstulich ........... 370/392 |
| 2007/0156919 | A1 | 7/2007 | Potti et al. |
| 2007/0162394 | A1 | 7/2007 | Zager et al. |
| 2007/0220302 | A1 | 9/2007 | Cline et al. |
| 2008/0034127 | A1 | 2/2008 | Nishio |
| 2008/0109577 | A1 | 5/2008 | Azevedo et al. |
| 2008/0253366 | A1 | 10/2008 | Zuk et al. |
| 2008/0270618 | A1 | 10/2008 | Rosenberg |
| 2008/0291910 | A1* | 11/2008 | Tadimeti et al. ........... 370/389 |
| 2008/0320582 | A1 | 12/2008 | Chen et al. |
| 2009/0063852 | A1 | 3/2009 | Messerges et al. |
| 2009/0077618 | A1 | 3/2009 | Pearce et al. |
| 2009/0106433 | A1 | 4/2009 | Knouse et al. |
| 2009/0252148 | A1 | 10/2009 | Dolganow et al. |
| 2009/0295905 | A1 | 12/2009 | Civanlar et al. |
| 2009/0327113 | A1 | 12/2009 | Lee et al. |
| 2010/0251343 | A1 | 9/2010 | Barrett |

OTHER PUBLICATIONS

IP Multimedia Subsystem, http://en.wikipedia.org/w/index.php?title=IP_Multimedia_Subsyst..., accessed May 15, 2008, 8 pgs.

Berners-Lee, T. et al., "Uniform Resource Identifiers (URI) : Generic Syntax," IETF RFC 2396, Aug. 1998.

Nielsen, H. F. et al., "Network Performance Effects of HTTP/1.1, CSS1, and PNG," Jun. 24, 1997, 1-19 pgs., W3 Consortium, http://www.w3.org/TR/NOTE-pipelining-970624$ld:Pipeline.html, v 1.48 Oct. 18, 1999 19:38:45 root Exp $.

Mapp, Glenford, "Transport Protocols—What's wrong with TCP," Jan. 28, 2004, pp. 1-60, LCE Lecture at: http://www-Ice.eng.cam.ac.uk/~gem11, 4F5-Lecture4.pdf.

Postel J., "Transmission Control Protocol," Sep. 1981, pp. 1-16, Information Sciences Institute, University of Souther California, Marina del Rey, California, http://www.faqs.orq/rfcs/rfc793.html.

Stevens, W. Richard, "TCP/IP Illustrated", vol. 1: The Protocols, Addison-Wesley Professional, Dec. 31, 1993.

Schneider, K. et al. "PPP for Data Compression in Data Circuit-Terminating Equipment (DCE)," RFC 1976, Aug. 1996m 10 pages.

Degermark, M. et al., "Low-Loss TCP/IP Header Compression for Wireless Networks," J.C.Baltzar AG, Science Publishers, Oct. 1997, pp. 375-387.

Adaptive Lossless Data Compression—ALDC, IBM, Jun. 15, 1994, 2 pages.

Craft, D. J. "A Fast Hardware Data Compression Algorithm and Some Algorithmic Extensions," IBM Journal of Research and Development, vol. 42, No. 6, Nov. 1998, 14 pages.

Office Communication for U.S. Appl. No. 11/366,367 maiied Aug. 4, 2009.

Office Communication for U.S. Appl. No. 11/366,367 mailed Jun. 1, 2011.

Berners-Lee, T. et al., RFC 1945, "Hypertext Transfer Protocol—HTTP/1.0," May 1996, 60 pages.

Dierks, T. et al., RFC 2246, "The TLS Protocol, Version 1.0," Jan. 1999, 80 pages.

Fielding, R. et al., "Hypertext Transfer Protocol—HTTP/1.1," W3 Consortium, Jun. 1999, pp. 1-114, http://www.w3.org/Protocols/rfc2616/rfc2616.html.

Freier, A. et al., Netscape Communications Corporation, "The SSL Protocol, Version 3.0," Mar. 1996, 60 pages.

Housley, R., et al., "Internet X.509 Public Key Infrastructure Certificate and CRL Profile," RFC 2459, Jan. 1999, 115 pages.

Postel, J., "Transmission Control Protocol," Sep. 1981, Information Sciences Institute, University of Southern California, Marina del Rey, California, http://www.faqs.org/rfcs/rfc793.html, pp. 1-21.

Official Communication for U.S. Appl. No. 10/172,411 mailed Jun. 19, 2006.

Official Communication for U.S. Appl. No. 11/139,061 mailed Sep. 22, 2009.

Official Communication for U.S. Appl. No. 12/199,768 mailed Dec. 16, 2013.

Official Communication for U.S. Appl. No. 13/615,007 mailed Jan. 7, 2014.

Official Communication for U.S. Appl. No. 11/258,551 mailed Jan. 4, 2010.

Official Communication for U.S. Appl. No. 13/174,237 mailed Mar. 21, 2014.

Official Communication for U.S. Appl. No. 13/174,237 mailed Dec. 8, 2014.

Official Communication for U.S. Appl. No. 12/199,768 mailed Jan. 15, 2015.

Official Communication for U.S. Appl. No. 12/475,307 mailed Jan. 26, 2015.

Official Communication for U.S. Appl. No. 13/174,237 mailed Apr. 6, 2015.

Official Communication for U.S. Appl. No. 12/199,768 mailed Apr. 29, 2015.

Official Communication for U.S. Appl. No. 13/174,237 mailed Sep. 25, 2014.

(56) References Cited

OTHER PUBLICATIONS

Official Communication for U.S. Appl. No. 12/199,768 mailed Apr. 23, 2014.
Official Communication for U.S. Appl. No. 11/366,367 mailed Jun. 21, 2013.
Official Communication for U.S. Appl. No. 13/229,483 mailed May 13, 2013.
Official Communication for U.S. Appl. No. 13/592,187 mailed Aug. 16, 2013.
Official Communication for U.S. Appl. No. 12/199,768 mailed Sep. 24, 2014.
Official Communication for U.S. Appl. No. 13/174,237 mailed on Aug. 12, 2015.
Official Communication for U.S. Appl. No. 12/475,307 mailed on Aug. 13, 2015.
Official Communication for U.S. Appl. No. 13/615,007 mailed on Aug. 19, 2015.
Cheng, J.M. et al., "A Fast, Highly Reliable Data Compression Chip and Algorithm for Storage Systems," IBM, vol. 40, No. 6, Nov. 1996, 11 pages.
Simpson, W. "The Point-To-Point Protocol (PPP)," RFC 1661, Jul. 1994, 54 pages.
Schneider, K. et al. "PPP For Data Compression In Data Circuit-Terminating Equipment (DCE)," RFC 1976, Aug. 1996rn 10 pages.
Castineyra, I. et al., "The Nimrod Routing Architecture," RFC 1992, Aug. 1996, 27 pages.
Degermark, M. et al., "Low-Loss TCP/IP Header Compression for Wireless Networks," J.C. Baltzar AG, Science Publishers, Oct. 1997, pp. 375-387.
"Direct Access Storage Device Compression and Decompression Data Flow," IBM Technical Disclosure Bulletin, vol. 38, No. 11, Nov. 1995, pp. 291-295.
"Drive Image Professional For DOS, OS/2 and Windows," WSDC Download Guide, http://wsdcds01.watson.ibm.com/WSDC.nsf/Guides/Download/Applications-DriveImage.htm, accessed Nov. 22, 1999, 4 pages.
"Drive Image Professional," WSDC Download Guide, http://wsdcds01.watson.ibm.com/wsdc.nsf/Guides/Download/Applications-DriveImage.htm, accessed May 3, 2001, 5 pages.
Electronic Engineering Times, Issue 759, Aug. 16, 1993, 37 pages.
Adaptive Lossless Data Compression—ALDC; IBM, Jun. 15, 1994, 2 pages.
ALDC1-5S—Adaptive Lossless Data Compression, IBM Microelectronics, May 1994, 2 pages.
ALDC1-20S—Adaptive Lossless Data Compression, IBM Microelectronics, May 1994, 2 pages.
ALDC1-40S—Adaptive Lossless Data Compression, IBM Microelectronics, May 1994, 2 pages.
ALDC-MACRO—Adaptive Lossless Data Compression, IBM Microelectronics, May 1994, 2 pages.
Craft, D. J., "Data Compression Choice No Easy Call," Computer Technology Review, Jan. 1994, 2 pages.
"Data Compression Applications and Innovations Workshop," Proceedings of a Workshop held in conjuction with the IEEE Data Compression Conference, Mar. 31, 1995, 123 pages.
IBM Microelectronics Comdex Fall 1993 Booth Location, 1 page.
"IBM Technology Products Introduces New Family of High-Performance Data Compression Products," IBM Corporation, Somers, NY, Aug. 16, 1993, 6 pages.
Zebrose, K. L., "Integrating Hardware Accelerators into Internetworking Switches," Telco Systems, Nov. 1993, 10 pages.
Readme, Powerquest Corporation, 1994-2002, 6 pages.
Costlow, T., "Sony Designs Faster, Denser Tape Drive," Electronic Engineering Times, May 20, 1996, 2 pages.
Electronic Engineering Times, Issue 767, Oct. 11, 1993, 34 pages.
"IBM Announces New Feature for 3480 Subsystem," Tucson Today, vol. 12, No. 337, Jul. 25, 1989, 1 page.
Craft, D. J., "A Fast Hardware Data Compression Algorithm and Some Algorithmic Extensions," IBM Journal of Research and Development, vol. 42, No. 6, Nov. 1998, 14 pages.
"Magstar and IBM 3590 High Performance Tape Subsystem Technical Guide," IBM, Nov. 1996, 287 pages.
Braden, R., "Requirements for Internet Hosts," RFC 1122, Oct. 1989, 101 pages.
Office Communication for U.S. Appl. No. 11/243,844 mailed Feb. 19, 2010.
Office Communication for U.S. Appl. No. 11/243,844 mailed Aug. 3, 2010.
Office Communication for U.S. Appl. No. 11/243,844 mailed Dec. 27, 2010.
Office Communication for U.S. Appl. No. 11/243,844 mailed Jun. 9, 2011.
Office Communication for U.S. Appl. No. 11/366,367 mailed Aug. 4, 2009.
Office Communication for U.S. Appl. No. 11/366,367 mailed Mar. 3, 2010.
Office Communication for U.S. Appl. No. 11/366,367 mailed Jun. 9, 2010.
Office Communication for U.S. Appl. No. 11/366,367 mailed Nov. 9, 2010.
Office Communication for U.S. Appl. No. 11/366,367 mailed Mar. 11, 2011.
Office Communication for U.S. Appl. No. 11/366,367 mailed Jun. 1, 2011.
Official Communication for U.S. Appl. No. 11/258,551 mailed Aug. 3, 2010.
Official Communication for U.S. Appl. No. 11/258,551 mailed Mar. 31, 2011.
Official Communication for U.S. Appl. No. 12/199,768 mailed Jun. 18, 2010.
Official Communication for U.S. Appl. No. 12/199,768 mailed Nov. 22, 2010.
Official Communication for U.S. Appl. No. 12/199,768 mailed Feb. 1, 2011.
Official Communication for U.S. Appl. No. 12/475,307 mailed Feb. 10, 2011.
Official Communication for U.S. Appl. No. 12/475,307 mailed Jul. 22, 2011.
Official Communication for U.S. Appl. No. 12/475,307 mailed Sep. 29, 2011.
Official Communication for U.S. Appl. No. 11/366,367 mailed May 18, 2012.
Official Communication for U.S. Appl. No. 11/243,844 mailed Nov. 8, 2011.
Official Communication for U.S. Appl. No. 11/243,844 mailed Jun. 14, 2012.
Freier, A. et al., "The SSL Protocol, Version 3.0," Netscape Communications Corporation, Mar. 1996, 60 pages.
Official Communication for U.S. Appl. No. 11/258,551 mailed Aug. 15, 2012.
Oracle Communication and Mobility Server, Aug. 2007, http://www.oracle.com/technology/products/ocms/otn_front.html, accessed May 15, 2008, 108 pgs.
Session Initiation Protocol, http://en.wikipedia.org/w/index.php?title=Session_Initiation_Protoc . . ., accessed May 14, 2008, 5 pgs.
IP Multimedia Subsystem, http://en.wikipedia.org/w/index.php?title=IP_Multimedia_Subsyst . . ., accessed May 15, 2008, 8 pgs.
F5 Networks Delivers Blistering Application Traffic Management Performance and Unmatched Intelligence Via New Packet Velocity ASIC and BIG-IP Platforms, F5 Networks, Inc. Press Release dated Oct. 21, 2002, 3 pgs.
Secure and Optimize Oracle 11i E-Business Suite with F5 Solutions, F5 Application Ready Network Guide, Oracle E-Business Suite 11i, Aug. 2007, 2 pgs.
Using the Universal Inspection Engine, Manual Chapter: BIG-IP Solutions Guide v4.6.2: Using the Universal Inspection Engine, 2002, 8 pgs.
Freier, Alan et al., "The SSL Protocol Version 3.0", IETF, Internet Draft, 62 pages, Nov. 18, 1996.
Dierks, T. et al., "The TLS Protocol Version 1.0", RFC 2246, 32 pages, Jan. 1999.

(56) References Cited

OTHER PUBLICATIONS

Housley, R. et al., "Internet X.509 Public Key Infrastructure Certificate and CRL Profile", RFC 2459, 121 pages, Jan. 1999.
Enger, R. and Reynolds, J., "FYI on a Network Management Tool Catalog: Tools for Monitoring and Debugging TCP/IP Internets and Interconnected Devices", RFC 1470, 52 pages, Jun. 1993.
Office Communication for U.S. Appl. No. 11/258,551, mailed on Mar. 3, 2009.
"Ethereal—Interactively browse network traffic," ethereal.com, 29 pages, www.ethereal.com/docs/man-pages/ethereal.1.html (accessed Apr. 15, 2004).
"Tethereal—Dump and analyze network traffic," ethereal.com, 11 pages, www.ethereal.com/docs/man-pages/tethereal.1.html (accessed Apr. 15, 2004).
"Editcap—Edit and/or translate the format of capture files," ethereal.com, 3 pages, www.ethereal.com/docs/man-pages/editcap.1.html (accessed Apr. 15, 2004).
"Network Sniffer," linuxmigration.com, 4 pages, www.linuxmigration.com/quickref/admin/ethereal.html (accessed Apr. 15, 2004).
"FAQ: Network Intrusion Detection Systems," robertgraham.com, Mar. 21, 2000, www.robertgraham.com/pubs/network-intrusion-detection.html (accessed Apr. 15, 2004).
Hinden, R. et al., "Format for Literal IPv6 Addresses in URL's," IETF RFC 2732, Dec. 1999.
Berners-Lee, T. et al., "Uniform Resource Identifiers (URI): Generic Syntax," IETF RFC 2396, Aug. 1998.
Valloppillil, Vinod et al., "Cache Array Routing Protocol v1.0," Feb. 1998, 7 pages, http://icp.ircache.net/carp.txt (accessed Jul. 25, 2008).
"Consistent Hashing," Wikipedia—the free encyclopedia, 1 page, http://en.wikipedia.org/w/index.php?title=Consistent_hashing &print . . . (accessed Jul. 25, 2008).
"Forwarding Plane," Wikipedia—the free encyclopedia, 5 pages, http://en.wikipedia.org/w/index.php?title=Forwarding_plane &printa . . . (accessed Jul. 31, 2008).
"Network Management," Wikipedia—the free encyclopedia, 3 pages, http://en.wikipedia.org/w/index.php?title=Network_management< . . . (accessed Jul. 31, 2008).
"Control Plane," Wikipedia—the free encyclopedia, 4 pages, http://en.wikipedia.org/w/index.php?title=Control_plane&printable=yes (accessed Jul. 31, 2008).
"Telecommunications Network," Wikipedia—the free encyclopedia, 2 pages, http://en.wikipedia.org/w/index.php?title=Telecommunications_net . . . (accessed Jul. 31, 2008).
Office Communication for U.S. Appl. No. 11/243,844, mailed on Oct. 8, 2008.
Office Communication for U.S. Appl. No. 11/243,844, mailed on Feb. 20, 2009.
U.S. Appl. No. 11/366,367, Official Communication mailed on Aug. 22, 2008.
U.S. Appl. No. 11/366,367, Official Communication mailed on Feb. 11, 2009.
About Computing & Technology, "Wireless/Networking, Nagle algorithm," visited Dec. 6, 2005, 2 pages, <http://compnetworking.about.com/od/tcpip/l/bldef_nagle.htm>.
Australia's Academic and Research Network, "Programs and large MTU, Nagle algorithm," visited Dec. 9, 2005, 3 pages, <http://www.aarnet.edu.au/engineering/networkdesign/mtu/programming.html>.
Berners-Lee, T. et al., RFC 1945, "Hypertext Transfer Protocol—HTTP/1.0," May 1996, 51 pages.
Fielding, R. et al., RFC 2616, "Hypertext Transfer Protocol—HTTP/1.1," Jun. 1999, 114 pages.
fifi.org, "Manpage of TCP," visited Dec. 9, 2005, 6 pages, <http://www.fifi.org/cgi-bin/man2html/usr/share/man/man7/tcp.7.gz>.
Kessler, G. et al., RFC 1739, "A Primer on Internet and TCP/IP Tools," Dec. 1994, 46 pages.
Nagle, J., RFC 896, "Congestion control in IP/TCP internetworks," Jan. 6, 1984, 13 pages.
OpenSSL, visited Apr. 12, 2006, 1 pg., <www.openssl.org>.

Paxson, V., RFC 2525, "Known TCP Implementation Problems," Mar. 1999, 61 pages.
Rescorla, E. "SSL and TLS, Designing and Building Secure Systems", Mar. 2001, Addison-Wesley, 46 pages.
RSA Laboratories, "PKCS #1 v2.0: RSA Cryptography Standard," Oct. 1, 1998, 35 pages.
SearchNetworking.com, "Nagle's algorithm," visited Dec. 6, 2005, 3 pages, <http://searchnetworking.techtarget.com/sDefinition/0,,sid7_gci754347,00.html>.
Tormasov, A. et al., "TCP/IP options for high-performance data transmission," visited Dec. 9, 2005, 4 pages, <http://builder.com.com/5100-6732-1050878.html>.
W3C, "HTTP/1.1 and Nagle's Algorithm," visited Dec. 6, 2005, 3 pages, <http://www.w3.org/Protocols/HTTP/Performance/Nagle/>.
Office Communication for U.S. Appl. No. 11/243,844, mailed on Jul. 16, 2009.
Nielsen, H. F. et al., "Network Performance Effects of HTTP/1.1, CSS1, and PNG," Jun. 24, 1997, 1-19 pgs., W3 Consortium, http://www.w3.org/TR/NOTE-pipelining-970624$Id:Pipeline.html, v 1.48 Oct. 18, 1999 19:38:45 root Exp $.
Mapp, Glenford, "Transport Protocols—What's wrong with TCP," Jan. 28, 2004, pp. 1-60, LCE Lecture at: http://www-lce.eng.cam.ac.uk/~gem11, 4F5-Lecture4.pdf.
Postel J., "Transmission Control Protocol," Sep. 1981, pp. 1-16, Information Sciences Institute, University of Souther California, Marina del Rey, California, http://www.faqs.org/rfcs/rfc793.html.
Jacobson, V. et al., "TCP Extensions for High Performance," May 1992, pp. 1-37, http://www.faqs.org/rfcs/rfc1323.html.
Stevens, W., "TCP Slow Start, Congestion Avoidance, Fast Retransmit, and Fast Recovery Algorithms," Jan. 1997, pp. 1-6, Suniste.dk, http://rfc.sunsite.dk/rfc/rfc2001.html.
Office Communication for U.S. Appl. No. 11/139,061, mailed on Feb. 5, 2009.
Office Communication for U.S. Appl. No. 11/139,061, mailed on Sep. 22, 2009.
Stevens, W. Richard, "TCP/IP Illustrated" vol. 1: The Protocols, Addison-Wesley Professional, Dec. 31, 1993.
Schroeder et al., "Scalable Web ServerClustering Technologies," IEEE Network May/Jun. 2000, p. 38-45.
Bryhni et al., "A Comparison of Load Balancing Techniques for Scalable Web Servers," IEEE Network, Jul./Aug. 2000, p. 58-64.
U.S. Appl. No. 11/258,551 Final Office Action, mailed Jan. 4, 2010, 10 pages.
Official Communication for U.S. Appl. No. 11/243,844 mailed Nov. 26, 2012.
Official Communication for U.S. Appl. No. 11/258,551 mailed Dec. 6, 2012.
Acharya et al., "Scalable Web Request Routing with MPLS", IBM Research Report, IBM Research Division, Dec. 5, 2001.
Reardon, Marguerite, "A Smarter Session Switch: Arrowpoint's CS Session Switches Boast The Brains Needed For E-Commerce," Data Communications, Jan. 1999, title page, pp. 3, 5, 18.
Hewitt, John R. et al., "Securities Practice And Electronic Technology," Corporate Securities Series, (New York: Law Journal Seminars-Press) 1998, title page, bibliography page, pp. 4.29-4.30.
Reardon, Marguerite, "A Smarter Session Switch: Arrowpoint's CS Session Switches Boast The Brains Needed For E-Commerce," Data Communications, Jan. 1999, title page, 6 pages.
Fielding, R. et al., "Hypertext Transfer Protocol—HTTP/1.1", Network Working Group, RFC 2068, Jan. 1997, 152 pages.
Fielding, R. et al., "Hypertext Transfer Protocol—HTTP/1.1", Network Working Group, RFC 2616, Jun. 1999, 165 pages.
"BIG-IPa Controller With Exclusive OneConnecta Content Switching Feature Provides a Breakthrough System for Maximizing Server and Network Performance", F5 Networks, Inc., Press Release, May 8, 2001, 3 pages (accessed Jun. 4, 2002).
Hochmuth, Phil, "F5, CacheFlow Pump Up Content-Delivery Lines", NetworkWorld, May 4, 2001, 3 pages, http://www.network.com/news/2001/0507cachingonline.html (accessed Jun. 1, 2005).
U.S. Appl. No. 10/172,411, Official Communication mailed Apr. 30, 2007.
U.S. Appl. No. 10/172,411, Official Communication mailed Nov. 13, 2006.

(56) References Cited

OTHER PUBLICATIONS

U.S. Appl. No. 10/172,411, Official Communication mailed Sep. 1, 2006.
U.S. Appl. No. 10/172,411, Official Communication mailed Jun. 19, 2006.
U.S. Appl. No. 10/172,411, Official Communication mailed Oct. 18, 2007.
U.S. Appl. No. 10/409,951, Official Communication mailed Jul. 17, 2008.
U.S. Appl. No. 10/409,951, Official Communication mailed Nov. 30, 2006.
U.S. Appl. No. 10/409,951, Official Communication mailed Mar. 8, 2007.
U.S. Appl. No. 10/409,951, Official Communication mailed Jan. 4, 2008.
U.S. Appl. No. 10/409,951, Official Communication mailed Aug. 24, 2007.
U.S. Appl. No. 10/409,951, Official Communication mailed Jun. 16, 2006.
U.S. Appl. No. 10/172,411, Official Communication mailed Apr. 25, 2008.
U.S. Appl. No. 10/172,411, Official Communication mailed Oct. 1, 2008.
U.S. Appl. No. 10/172,411, Official Communication mailed Dec. 16, 2005.
Official Communication for U.S. Appl. No. 12/475,307 mailed on Aug. 30, 2016, 29 pages.
Official Communication for U.S. Appl. No. 14/935,231 mailed on Sep. 8, 2016, 9 pages.
Official Communication for U.S. Appl. No. 14/935,231 mailed on Mar. 10, 2016.
Official Communication for U.S. Appl. No. 13/615,007 mailed Jul. 2, 2014.
Official Communication for U.S. Appl. No. 13/615,007 mailed Sep. 18, 2014.
Official Communication for U.S. Appl. No. 13/615,007 mailed Feb. 3, 2015.
Official Communication for U.S. Appl. No. 14/944,003 mailed Jun. 8, 2016.
Official Communication for U.S. Appl. No. 14/935,231 mailed on Mar. 10, 2016, 7 pages.
Official Communication for U.S. Appl. No. 13/615,007 mailed Jul. 2, 2014, 14 pages.
Official Communication for U.S. Appl. No. 13/615,007 mailed Sep. 18, 2014, 3 pages.
Official Communication for U.S. Appl. No. 13/615,007 mailed Feb. 3, 2015, 14 pages.
Official Communication for U.S. Appl. No. 14/944,003 mailed Jun. 8, 2016, 10 pages.

* cited by examiner

SYSTEM AND METHOD FOR DIRECTING NETWORK TRAFFIC IN TUNNELING APPLICATIONS

RELATED APPLICATIONS

This application claims the benefit of U.S. Provisional Application No. 60/512,977 filed on Oct. 20, 2003, which is hereby claimed under 35 U.S.C. §119(e).

FIELD OF THE INVENTION

The present invention relates to directing traffic across a computer network, and in particular, to directing traffic to a network tunnel based, in part, on a deep packet inspection.

BACKGROUND

The Internet has evolved into a ubiquitous network and has inspired the development of a variety of new applications in business markets. These new applications have driven the demand for increased and well-defined transmission guarantees in the backbone of the network.

However, the demands placed on the network by these new applications and services, in terms of speed, bandwidth, and the like, have strained the resources of existing networking infrastructures. In addition to the issue of resource constraints, many businesses have demanded the ability to provide differentiated classes and quality of services (QoS) to its consumers. Such differentiated services may include providing various tunneling technologies, such as Internet Protocol Security (IPSec), selective tunnel usage, selective routes or tunnels in a MultiProtocol Label Switching (MPLS) network, and the like, based on a variety of service expectations.

However, many such tunneling technologies are dependent on a restrictive set of further technologies to map packets to a tunnel through the network. For example, differentiated services (diffserv) are commonly employed to limit some types of traffic to some rate or to guarantee some other quality of service. As a mechanism for QoS, diffserv configured routers typically modify Internet Protocol (IP) packet headers in the network traffic in a manner that may be understood by upstream routers. The upstream routers may in turn, be configured to route the packets towards a desired tunnel based, in part, on the modifications in the packet header.

Use of diffserv routers, unfortunately, often results in increased complexity, and cost, to the overall networking infrastructure. Additionally, many diffserv routers currently operate at a layer 3 of the Open Systems Interconnection (OSI) seven layer reference model, further constraining the flexibility of tunnel selection. Thus, there is a need in the industry for alternative approaches to distributing network traffic to selected tunnels. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
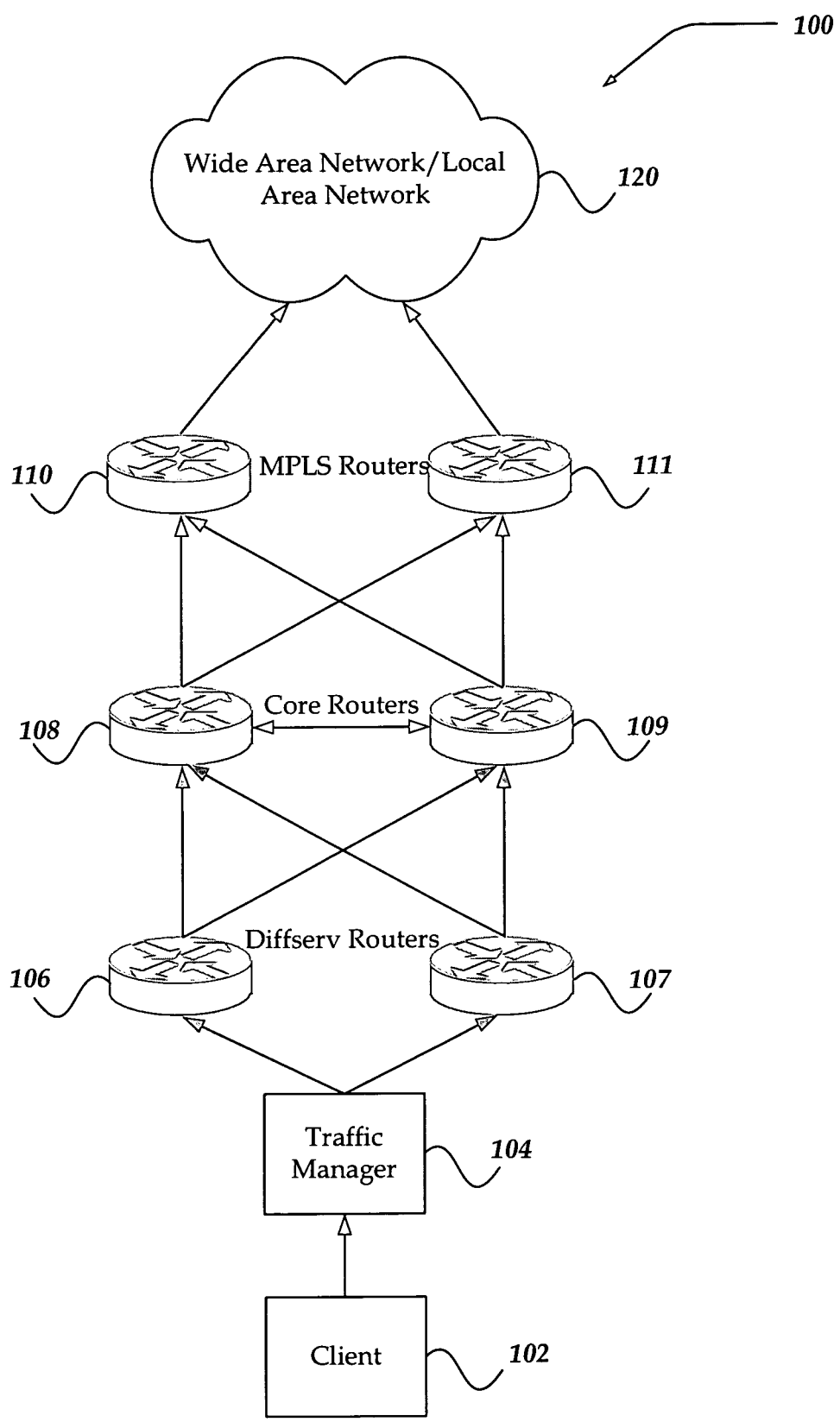
FIG. 1 illustrates a system diagram of one embodiment of a system architecture employing differentiated service routers.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the terms "a," "an," and "the" include plural references. The meaning of "in" includes "in" and "on."

The term "or" is an inclusive "or" operator, and includes the term "and/or," unless the context clearly dictates otherwise.

The phrase "in one embodiment," as used herein does not necessarily refer to the same embodiment, although it may.

The term "based on" is not exclusive and provides for being based on additional factors not described, unless the context clearly dictates otherwise.

The term "packet" includes an IP (Internet Protocol) packet. The term "flow" includes a flow of packets through a network that typically share a common source and destination.

The term "node" refers to a network element that typically interconnects one or more devices, or even networks.

The terms "comprising," "including," "containing," "having," and "characterized by," include an open-ended or inclusive transitional construct and does not exclude additional, unrecited elements, or method steps. For example, a combination that comprises A and B elements, also reads on a combination of A, B, and C elements.

Briefly stated, the present invention is directed to a system and method for directing traffic towards a tunnel in a network. The invention enables a network device to extract data from a received packet. A deep packet inspection is employed that enables examination of the extracted data at virtually any layer of an Open System Interconnection (OSI) layered protocol of the packet. If the extracted data does not satisfy a flow criteria, one or more additional packets may be inspected at the deep packet level to determine whether data from the first and additional packets satisfies the flow criteria. If the extracted data satisfies the flow criteria, a tunnel is determined based, in part, on the flow criteria. Tunnel determination may be based on a load-balancing mechanism, a pre-designated tunnel for the flow criteria, and the like. The packet is associated with, and forwarded towards, the determined tunnel. Subsequent packets associated with the same flow of packets may be forwarded to the same determined tunnel by maintaining a unique identifier associated with the packet.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention.

As shown in the figure, system 100 includes client 102, traffic manager 104, diffserv routers 106-107, core routers 108-109, Multiprotocol Label Switching (MPLS) routers 110-111, and Wide Area Network (WAN)/Local Area Network (LAN) 120. Traffic manager 104 is in communication with client 102 and diffserv routers 106-107. Core routers 108-109 are in communication with MPLS routers 110-111 and diffserv routers 106-107. MPLS routers 110-111 are also in communication with WAN/LAN 120. Although not shown, another network, substantially similar to WAN/LAN 120 may reside between and be in communication with traffic manager 104 and client 102.

Client 102 may be any device capable of sending and receiving a packet over a network, and the like, to and from traffic manager 104. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client 102 may be any device that is capable of connecting using a wired or wireless communication medium such as a PDA, POCKET PC, wearable computer, and any other device that is equipped to communicate over a wired and/or wireless communication medium.

Traffic manager 104 includes any device that manages network traffic. Such devices include, for example, routers, proxies, firewalls, load balancers, devices that perform network address translation, any combination of the preceding devices, and the like. Traffic manager 104 may, for example, control the flow of data packets delivered to and forwarded from client 102. Traffic manager 104 may direct a request for a resource at a network address accessible over WAN/LAN 120, and the like, based on network traffic, network topology, capacity of a server, content requested, and a host of other load balancing metrics. Traffic manager 104 may recognize packets that are part of the same communication, flow, and/or stream and may perform special processing on such packets, such as directing them to the same router, service, or the like. Traffic manager 104 may, for example, extract packet information that may be employed in generating a unique identifier for the flow of packets for which the packet is associated. Such packet information may include, but is not limited to, a source address, source port number, destination address, destination port number, a combination of the above, and the like. However, as shown, traffic manager 104 may be constrained to making routing decisions for packets based on header information associated with the packets. Traffic manager 104 may also maintain a persistence table, which stores mappings between the unique identifiers and router, service, and the like.

Traffic manager 104 may be implemented using one or more personal computers, POCKET PCs, wearable computers, multiprocessor systems, microprocessor-based or programmable consumer electronics, network PCs, cell phones, smart phones, pagers, walkie talkies, radio frequency (RF) devices, infrared (IR) devices, CBs, integrated devices combining one or more of the preceding devices, and the like. Such devices may be implemented solely in hardware or in hardware and software.

WAN/LAN 104 is enabled to employ any form of computer readable media for communicating information from one electronic device to another. In addition, WAN/LAN 104 can include the Internet in addition to local area networks (LANs), wide area networks (WANs), direct connections, such as through a universal serial bus (USB) port, other forms of computer-readable media, and any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links. Furthermore, remote computers and other related electronic devices could be remotely connected to either LANs or WANs via a modem and temporary telephone link.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" includes a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Routers 106-111 include virtually any dedicated network element configured to receive a packet and retransmit it, towards a destination. Routers 106-111 may be used to extend or segment a network by forwarding the packet from one network element to another, or even one logical network to another. Routers 106-111 typically operate at layer 3 and below in the standard OSI reference model for networking. However, some of routers 106-111 may provide additional functionality that operates above layer 3 of the OSI reference model.

As shown in the figure, diffserv routers 106-107 are configured to provide differentiated services for categorizing and prioritizing network traffic. Differentiated services include mechanisms for adding QoS to networking structures such as system 100. Diffserv routers 106-107 may employ values within a layer 3 (IP), layer 4 (TCP/IP) packet headers to tag and identify a particular behavior to be applied by each node to the packet. One such implementation of diffserv routers 106-107 employs an IP type of service (TOS) field within the IP header of the packet as a diffserv byte. Typically, diffserv routers 106-107 operate at layer 3 of the OSI reference model.

Core routers 108-109 include routers that are configured to receive diffserv mapped packets and map the packets to a tunnel. In one embodiment, core routers 108-109 employ the diffserv byte to map the packet to the tunnel. As shown in FIG. 1, the tunnel includes an MPLS tunnel type of infrastructure.

MPLS routers 110-111 may include edge label switching routers (ELSR), and the like, that are configured to perform initial packet processing and classification so that each packet may be routed through an MPLS label switching network (or MPLS tunnel).

Operationally, client 102, another network device, resource, or the like, may forward a packet to traffic manager 104. Traffic manager 104 may employ a variety of mechanisms based on packet header information to forward the packet towards a determined diffserv router (106-107). Once the packet is received by one of diffserv routers 106-107, differentiated services are employed to classify the packet typically by modifying the packet's TOS field. Once the packet is classified by diffserv routers 106-107, these classes of service may be mapped to sets of MPLS tunnels, by core routers 108-109, to complete the architecture illustrated in FIG. 1. However, a limiting factor in MPLS-based quality of service architectures today is the differentiated service protocol employed by diffserv routers 106-107. This is because diffserv routers 106-107 typically are unable to differentiate, and tag, a packet based on higher (deeper) layers of the OSI layered protocol. Thus, as shown in the figure, using differentiated services to define tunnel ingress adds an additional layer of dedicated routers to the architecture, resulting in increased cost, and complexity.

The present invention is directed to addressing the above-mentioned shortcomings, disadvantages and problems, as described below in FIGS. 2 and 4.

Figure 2:
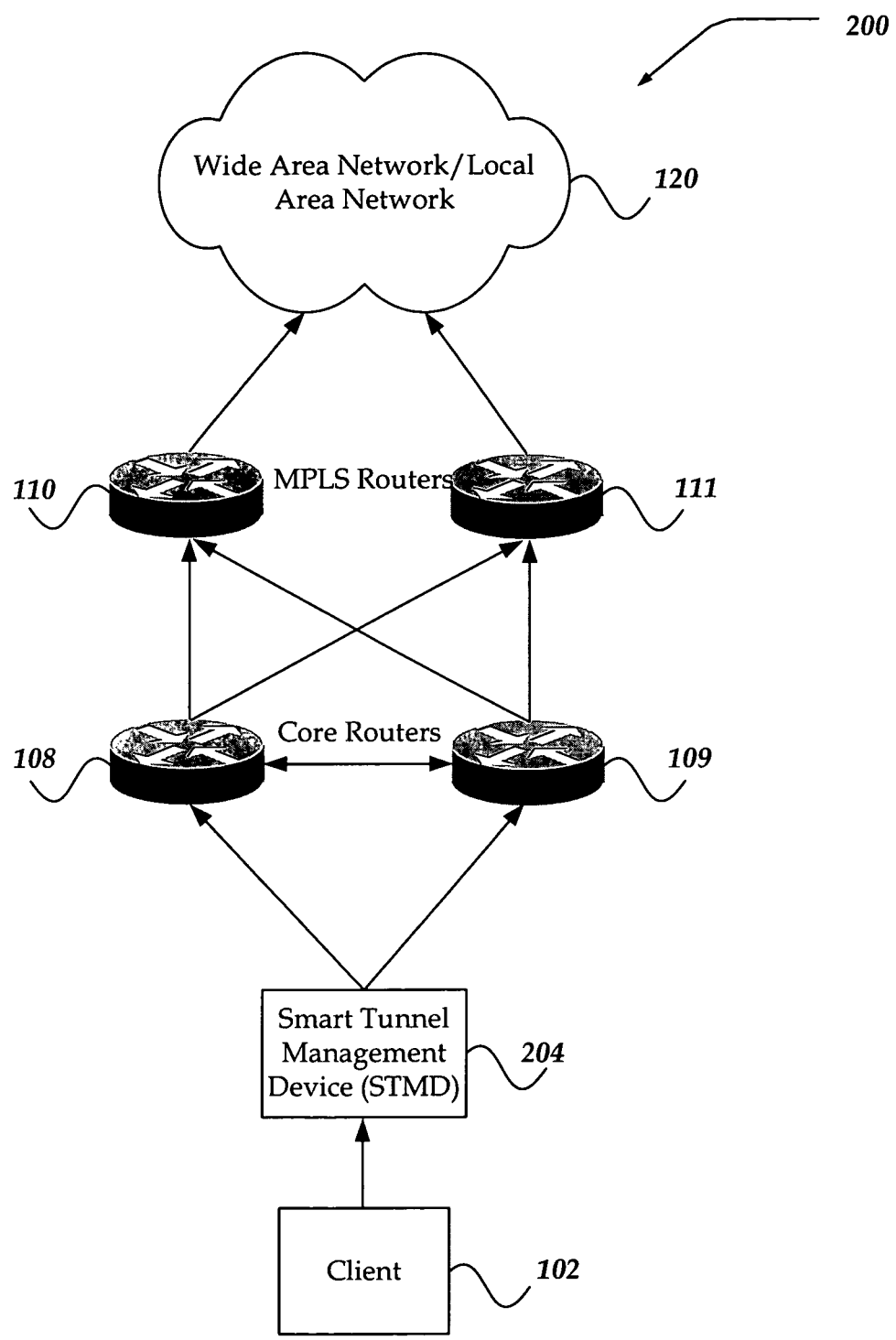
FIG. 2 illustrates a system diagram of one embodiment of a system architecture in which the invention may be practiced without differentiated service routers.

FIG. 2 illustrates a system diagram of one embodiment of a system architecture in which the invention may be practiced. Not all the components may be required to practice the invention, and variations in the arrangement and type of the components may be made without departing from the spirit or scope of the invention.

As shown in the figure, system 200 includes client 102, smart tunnel management device (STMD) 204, core routers 108-109, MPLS routers 110-111, and Wide Area Network (WAN)/Local Area Network (LAN) 120. STMD 204 is in communication with client 102 and core routers 108-109. Core routers 108-109 are in communication with MPLS routers 110-111. MPLS routers 110-111 are also in communication with WAN/LAN 120. Although not shown, another network, substantially similar to WAN/LAN 120 may reside between and be in communication with STMD 204 and client 102. A difference between the environment shown in FIG. 1 and that shown in FIG. 2 is that instead of including separate traffic classifications and MPLS labeling routers (diffserv routers and MPLS routers), STMD 204 is configured to include an ability to perform deep packet inspections upon packets within a network. Deep packet inspections enable STMD 204 to classify traffic and direct the traffic towards a determined tunnel, without the need for the additional overhead of diffserv routers.

Deep packet inspection and the generation of flow criteria is described in more detail in U.S. patent application Ser. No. 10/385,790, filed Mar. 10, 2003, and entitled "Method and System for Managing Network Traffic," which is hereby incorporated by reference. Briefly however, deep packet inspection enables STMD 204 to examine contents of a packet associated with virtually any layer of the OSI layered protocol of the packet, e.g., an HTTP request, an HTTPS request, including Secure Socket Layer (SSL) protocol data, a Session Initiation Protocol (SIP) request, and the like, including a request for an HTML page, a request including a Uniform Resource Locator (URL), eXtensible Markup Language (XML) content, information that identifies a user, such as a cookie, and the like.

Deep packet inspection provides syntax for a set of rules that enable the creation of flow criteria for making tunnel determinations based in part on arbitrary data within any TCP/UDP/IP connection. The flow criteria may include conditional instructions and flow control instructions that enable one to perform actions based on specified conditions.

The rule syntax provides the ability to examine chunks of data, described as offsets and lengths of data, with respect to the TCP, UDP, HTTP payload, and the like. This examination includes supporting arbitrary expressions, including full access to protocol headers, such as TCP, as well as TCP/UDP content, and application data at virtually any layer of the OSI protocol. For example, flow criteria may include a symbolic variable, "HTTP_cookie," that indirectly causes received data to be buffered. In processing this reference, STMD 204 may buffer more than one packet, to extract the data corresponding to the HTTP cookie. In one embodiment, the number of packets that are buffered is restricted to the number of packets required to identify the referenced data. In another embodiment, the number of packets that are buffered is selectable based on a number of packets, number of bits, a request to access one or more symbolic variables, and the like.

The rule syntax further enables examination of data from a first layer of the OSI layered protocol, and a second layer of the OSI layered protocol of the packet, where the first and second layers are from any of the OSI layers. The rule syntax enables formation of flow criteria that includes examination of data from at least one layer of the OSI layered protocol, at least two different layers, and virtually any combination of data from one or more layers.

In one embodiment, the rule syntax enables access to one or more symbolic variables. Some of the variables may represent data that are available in the IP packet header. The following table illustrates one embodiment of a non-exhaustive set of symbolic variables that are available to generate flow criteria and represent such packet header data.

| Variable Name | Description |
| --- | --- |
| client_addr | Used to represent a source IP address. This variable may be replaced with an unmasked IP address. |
| server_addr | Used to represent a destination IP address. This variable may be replaced with an unmasked IP address. The server_addr variable may be used to represent the destination address of the packet. This variable may also be useful when determining a tunnel for traffic towards a wildcard tunnel. |
| client_port | Used to represent a source port number. |
| server_port | Used to represent a destination port number. |
| link_protocol | Used to represent an IP protocol. This variable may be replaced with a numeric value representing an IP protocol such as TCP, UDP, IPSec, SOCKS, and the like. |
| link_qos | Used to represent a Quality of Service level. |
| ip_tos | Used to represent a Type of Service (ToS) level. |

The following table illustrates one embodiment of a set of symbolic variables that may be employed to generate flow criteria to evaluate layer seven data in a buffered TCP stream, even if it is not part of an HTTP connection.

| Variable Name | Description |
| --- | --- |
| tcp_content | This variable enables a creation of a basic expression that may be employed to load balance, persist, and determine a tunnel, based in part on arbitrary data within a TCP/IP connection. The variable returns TCP data content up to a pre-determined buffer size. This variable may also be employed to search for specific strings when establishing a non-HTTP connection. |
| tcp_bytes_collected | This variable returns an amount of content that has currently been collected. |

The following table illustrates one embodiment of a set of symbolic variables that may be employed to generate flow criteria to evaluate HTTP data.

| Variable Name | Description |
| --- | --- |
| http_method | This variable specifies an action of the HTTP request. Common values include GET, POST, and the like. |
| http_uri | Specifies a URL, but may not include the protocol and a fully qualified domain name (FQDN). For example, if the URL is http://www.uspto.gove/buy.asp, then the URI is /buy.asp. |
| http_version | Specifies an HTTP protocol version string. Possible values include "HTTP/1.0", "HTTP/1.1," and the like. |
| http_host | Specifies a value in a Host: header of an HTTP request. It may indicate that the actual FQDN that a source requested. Possible values are an FQDN, host IP address in dot notation, and the like. |
| http_cookie(<cookie_name>) | Specifies a value in a cookie: header for a specified cookie name. An HTTP cookie header line can contain one or more cookie name value pairs. The variable further evaluates to a value of the cookie with the name <cookie_name>. For example, given a request with the following cookie header line: Cookie: green-cookie = 4; blue-cookie = horses, The variable http_cookie ("blue-cookie") evaluates to the string horses. |
| http_header(<header_tag_string>) | This variable evaluates the string following the HTTP header tag specified. For example, one may specify the http_host variable with the http_header variable. |

-continued

| Variable Name | Description |
| --- | --- |
| http_content[(<minlength>)] | This variable evaluates a string following an HTTP content tag that is specified. For example, if one wishes to determine a tunnel based on the value of the string date, the flow criteria might look as follows:<br>if (findstr (http_content, "date=",5,6) == "052102" {use pool date_pool;<br>} else if (http_content_collected < 512) accumulate;<br>} else<br>{ use pool other_pool}<br>Note that the http_content variable uses the content_length or transfer_encoding fields to determine an available content. |
| http_content_collected | Returns an amount of content that has currently been collected. |

In another embodiment of the invention, the following non-exhaustive table of functions is available for use in extracting and manipulating data from the received packets, and in specifying flow criteria, and a unique identifier for maintaining persistence to a determined tunnel.

| | |
| --- | --- |
| substr( ) | Returns a string starting at an offset specified. |
| getfield( ) | Splits a string on a character, and returns the string corresponding to a specific field. |
| findclass( ) | Finds a member of a class that contains a result of a specified expression, and returns that class member. |
| decode_uri( ) | Evaluates an expression and returns a string with any escape sequences decoded as per HTTP escape sequences defined in RFC 2396, and the like. |
| domain( ) | Parses and returns up to a specified number of trailing parts of a domain name from a specified expression. |
| imid( ) | Parses the http_uri variable and user_agent header for an i-mode ™ identifier string that may be used for i-mode persistence, or the like. This may be employed for i-mode compatible devices, such as wireless phones. |
| order( ) | Sorts two or more strings in a specified order and concatenates the results. |

To employ the flow criteria generated from the rule syntax, one typically identifies the element or elements, in a packet to be used. This may be achieved, for example, by employing a filter on the output of tcpdump, or employing a network protocol analyzer to examine packets on the wire, and the like. However, the invention is not so limited and virtually any mechanism may be employed, without departing from the scope of the invention.

As one, non-exhaustive, example, for employing flow criteria, one may use a tcp_content attribute to find a SOCKS port value. If the SOCKS port value is located in the packet, the connection may be sent to a pool, such as HTTP_socks, a pre-designated tunnel associated with the SOCKS port value, and the like.

As shown in FIG. 2, STMD 204 is illustrated as a single device. However, the invention is not so limited. For example, STMD 204 may represent a switch fabric comprising a plurality of STMDs. In one embodiment, the plurality of STMDs is arranged in a peer-to-peer configuration.

Although FIG. 2 is described employing MPLS tunnels, the present invention is not so limited, and virtually any tunneling technology may employed without departing from the scope of the invention. For example, SOCKetS (SOCKS) is one such tunneling protocol that may be employed. Client 102 may transmit a packet that includes a TCP header, a SOCKS header, and data. STMD 204 may extract data from one or more fields with the SOCKS header, or from any combination of fields in the SOCKS header, TCP header, application data, and the like. STMD 204 may then employ the extracted data to determine a tunnel based on a load-balancing mechanism, a pre-designated tunnel for SOCKS traffic, and the like. STMD 204 may further generate a unique identifier associated and maintain persistence with packet traffic within the determined SOCKS tunnel.

Figure 3:
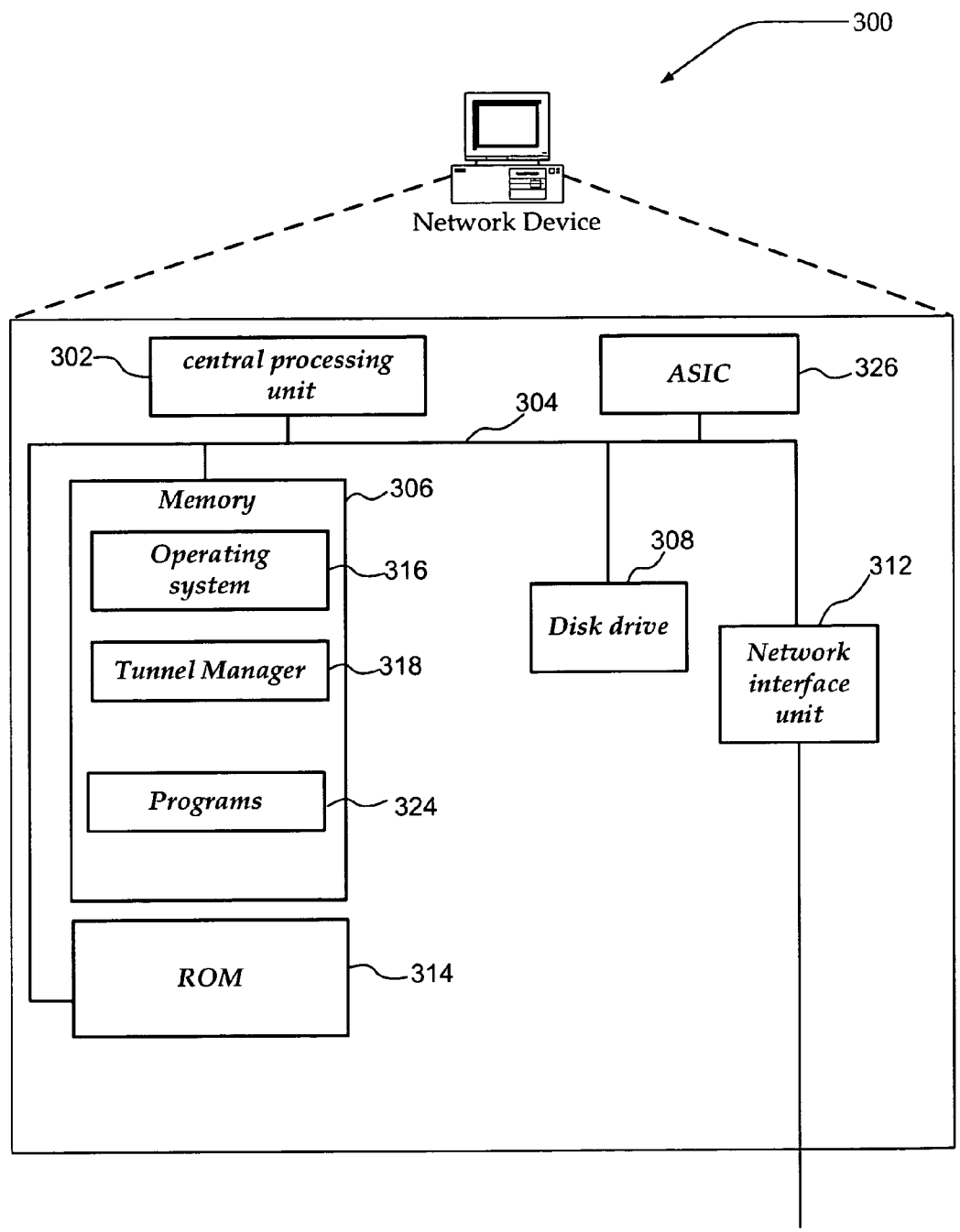
FIG. 3 illustrates a block diagram of one embodiment of a network device that may be employed to perform the invention.

FIG. 3 illustrates a functional block diagram of one embodiment of a network device in which the invention may be practiced. It will be appreciated that not all components of network device 300 are illustrated, and that network device 300 may include more or less components than those shown in FIG. 3. Network device 300 may operate, for example, as a router, bridge, firewall, gateway, traffic management device, distributor, load balancer, server array controller, or proxy server. The communications may take place over a network, such as network 120 in FIG. 1-2, the Internet, a WAN, LAN, or some other communications network known to those skilled in the art.

As illustrated in FIG. 3, network device 300 includes a central processing unit (CPU) 302, mass memory, and a network interface unit 312 connected via a bus 304. Network interface unit 312 includes the necessary circuitry for connecting network device 300 to a router, such as diffserv routers 106-107 of FIG. 1, core routers 108-109 of FIG. 2, a network, and the like. Network interface unit 312 is constructed for use with various communication protocols including the TCP/IP and UDP/IP protocol. Network interface unit 312 may include or interface with circuitry and components for transmitting packets, and the like, over a wired and/or wireless communications medium. Network interface unit 312 is sometimes referred to as a transceiver, Network Interface Card (NIC), and the like.

The mass memory generally includes random access memory ("RAM") 306, read-only memory ("ROM") 314, and one or more permanent mass storage devices, such as hard disk drive 308. The mass memory stores operating system 316 for controlling the operation of network device 300. Operating system 316 may comprise an operating system such as UNIX, LINUX™, Windows™, and the like.

In one embodiment, the mass memory stores program code and data for implementing tunnel manager 318, and related program code and data, in accordance with the present invention. The mass memory may also store additional programs 324 and data for performing the functions of network device 300. Programs 324 may also include applications that are employed by tunnel manager 318 to associate a packet to a determined tunnel, load-balance across tunnels, manage persistence data for maintaining a tunnel determination, and the like.

In one embodiment, network device 300 includes one or more Application Specific Integrated Circuit (ASIC) chips 326 connected to bus 304. As shown in FIG. 3, network interface unit 312 may connect to the bus through ASIC chip 326. ASIC chip 326 includes logic that performs some of the functions of network device 300. For example, in one embodiment, ASIC chip 326 performs a number of packet processing functions, to process incoming packets, determine a tunnel, associate the packets with the determined tunnel, and to forward the packets. In one embodiment, determined actions of determining the tunnel may be performed by ASIC chip 326, a similar hardware device, and the like. In one embodiment, the network device 300 includes one or more field-programmable gate arrays (FPGA) (not shown), instead of, or in addition to, ASIC chip 326. A number of functions of the network device can be performed by ASIC chip 326, by an FPGA, by CPU 302 with the logic of program code stored in mass memory, or by a combination of the ASIC chip and the CPU.

Computer storage media may include volatile and non-volatile, removable and non-removable media implemented in any method or technology for storage of information, such as computer readable instructions, data structures, program modules or other data. Examples of computer storage media include RAM 306, ROM 314, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network device 300 may also include an input/output interface (not shown) for communicating with external devices or users.

Network device 300 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 300 can also be implemented as a combination of blades and additional components in the chassis.

Illustrative Method of Distributing Traffic Towards a Tunnel

Figure 4:
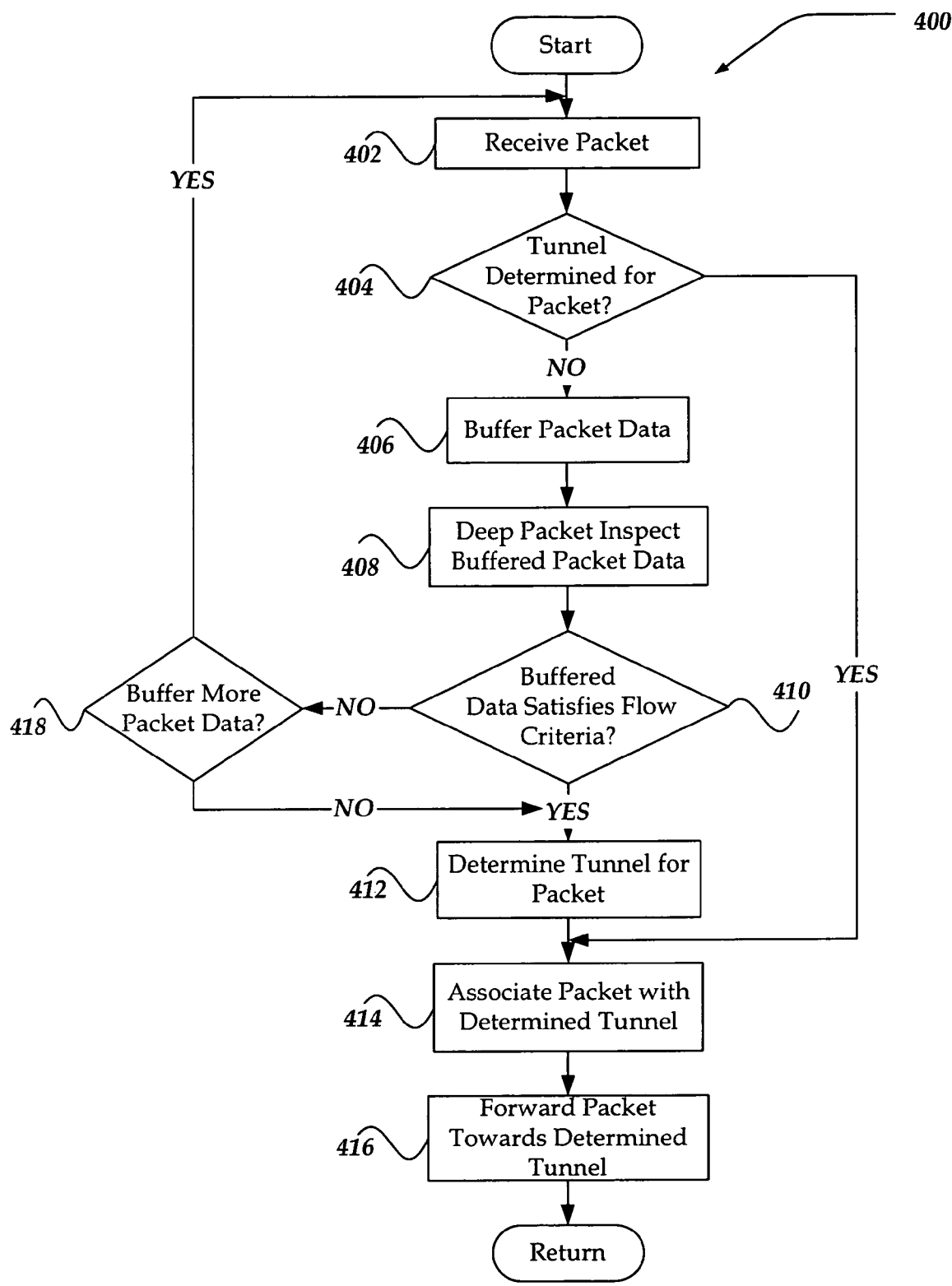
FIG. 4 is a flow chart illustrating a process for directing traffic to a network tunnel based, in part, on a deep packet inspection.

FIG. 4 is a flow chart illustrating a process for directing traffic to a network tunnel based, in part, on a deep packet inspection, according to one embodiment of the invention. In one embodiment process 400 is deployed within STMD 204 of FIG. 2.

Process 400 begins after a start block, at block 402, where a packet is received. Typically, the packet is received from a network device, such as client 102 in FIG. 2.

The process next proceeds to decision block 404, where a determination is made whether a tunnel is already determined for the packet. A tunnel may already be determined for the received packet where the packet is associated with a flow of packets that has already been processed by process 400. In such an instance, a tunnel has already been determined, and may persist for the flow of packets. In one embodiment, a unique identifier is extracted from the packet. The unique identifier may include TCP/IP header information, that includes but is not limited to, a source address, a destination address, a source port number, and a destination port number. A search is then performed within a database, file, text, and the like, for a match on the unique identifier. If a match is found, then the associated tunnel is employed for the packet. If a tunnel has already been determined for this packet flow, processing branches to block 414; otherwise, processing continues to block 406.

At block 406, the received packet is added to a buffer that is configured to maintain packet data received within the current communication. Buffering packets may include reconstructing packets in order to view data at various layers of the OSI layered protocol stack, including OSI layers two through seven. Processing continues to block 408, where a deep packet inspection of the buffered packet data is performed. Deep packet inspection includes examining the buffered data to determine whether it satisfies a flow criterion. Flow criteria may include for example, whether the buffered data includes an HTTP cookie, specific XML data, other application data, and the like. The flow criteria may include multiple sub-criteria, or a single sub-criterion. The flow criteria may thus seek data from a first layer and a second layer of the OSI layered protocol. For example, the flow criteria may seek buffered data that indicates the packet is a UDP packet and includes particular FTP application data, and the like. Thus, flow criteria may include virtually any condition, text, and the like, associated with a network packet, packets, and the like.

Process 400 continues to decision block 410, where a determination is made whether the buffered data satisfies the flow criteria. The buffered data may not satisfy the flow criteria for a variety of reasons. For example, the flow criteria may seek a specific data item, such as a specific HTTP cookie. HTTP cookies typically span more than one packet. As such, additional packets may need to be buffered to determine whether the flow criteria are satisfied. If the buffered data does not satisfy the flow criteria, processing branches to decision block 418. If however, it is determined that the buffered data does satisfies the flow criteria, processing flows to block 412.

At decision block 418, a determination is made whether to buffer more packet data from another packet in the flow of packets. The determination to buffer more packet data may be based in part on an implicit determination. For example, where it is known that the flow criteria spans several packets, such as in application data, and the like, process 400 may automatically decide to get a sufficient number of packets to be able to adequately determine whether the buffered data satisfies the flow criteria. One such example is where the flow criteria include examining at a deep packet inspection level for an HTTP cookie.

The determination to buffer more packet data may also be based on an instruction that specifies the amount of data to buffer. For example, an instruction may include a rule that requests buffering X number of bytes of data, and if the flow criteria is not satisfied after the X bytes, then give up. In another example, the flow criteria may include examining at a deep packet level for an XML tag called 'foo.' Decision block 418 then may decide to buffer X more bytes, and if at block 408 the XML tag "foo" is still not found, and then give up. In any event, if it is determined to buffer more packet data, processing branches back to block 402 where another packet is received; otherwise, processing branches to block 412.

At block 412, a tunnel is determined for the packet(s). A tunnel may be determined based on a variety of conditions, including a load-balancing mechanism, a pre-designated tunnel that is associated with the flow criteria, a predetermined tunnel where the flow criteria is not satisfied, and the like.

Processing next flows to block 414, where the determined tunnel is associated with the received packet. Association may include modifying the packet, packet payload, and the like. For example, a MPLS label that identifies the determined tunnel may be carried or encapsulated in a layer-2 header of the packet. Where the determined tunnel includes an IPSec tunnel, the packet may be encapsulated within another packet specific to the determined IPSec tunnel. Where the determined tunnel includes a pre-designated SOCKS connection, the packet may be associated with that SOCKS connection. This may include, but is not restricted to, sending a SOCKS proxy request to open the connection.

Additionally, pre-determined header information may be extracted from the packet to generate a unique identifier. The unique identifier may be associated with the determined tunnel, and together the information may be maintained in a text file, database, memory, and the like, so that related packets in the same flow of packets may be routed to the same determined tunnel, with minimal additional overhead.

Once the packet is associated with the determined tunnel, the packet is forwarded towards the determined tunnel. Upon completion of block 416, processing returns to a calling process.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

Illustrative Example of a Tunnel Determination on XML Data

Figure 5:
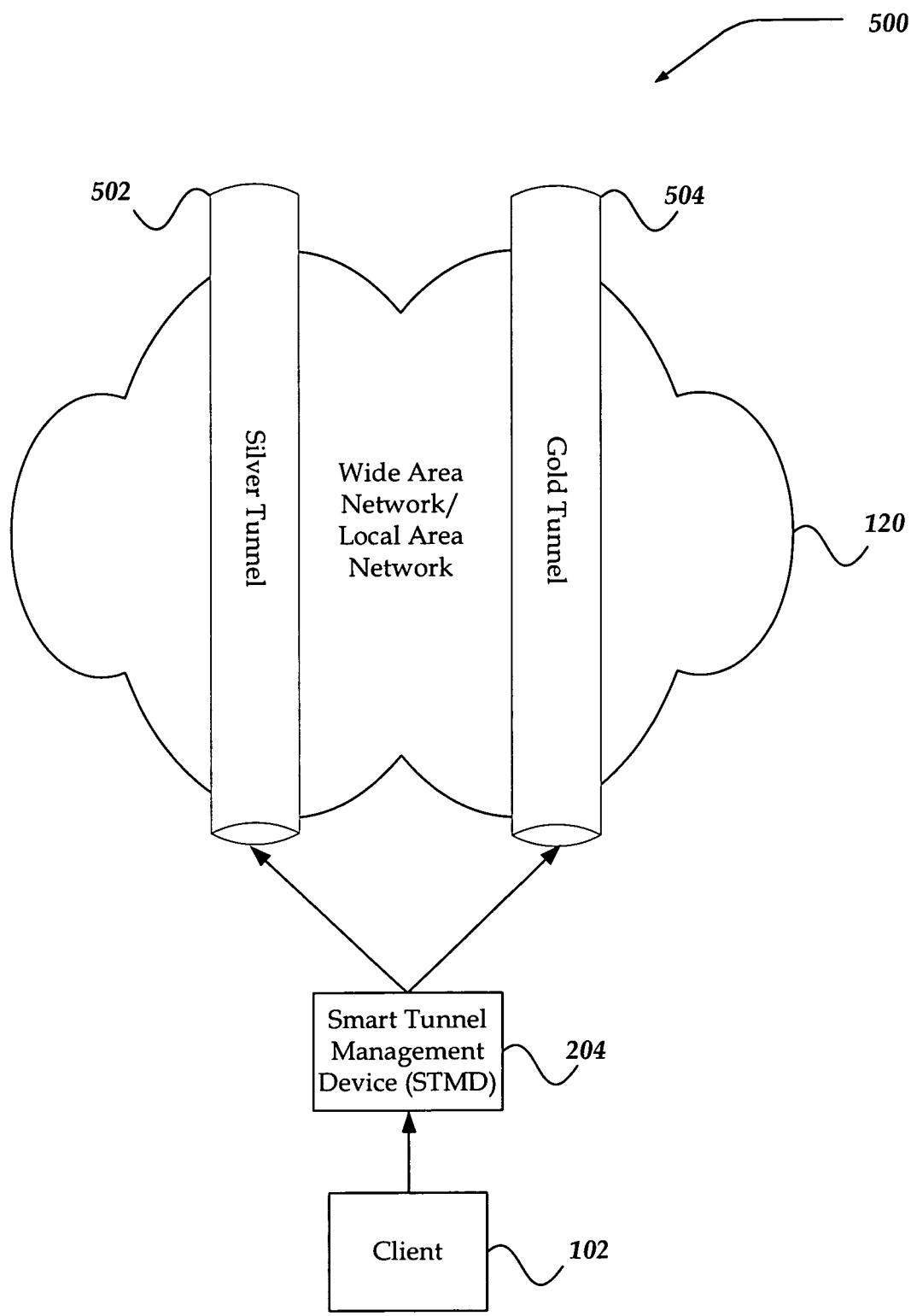
FIG. 5 is an illustrative example of a tunnel determination on XML data, according to one embodiment of the invention.

FIG. 5 is an illustrative example of a tunnel determination on XML data, according to one embodiment of the invention. System 500 is intended to provide one example of tunnel determination, and as such, is not intended to limit the present invention.

As shown in the figure, system 500 includes client 102, STMD 204, WAN/LAN 120, silver tunnel 502, and gold tunnel 504. Components numbered similar to those in FIG. 2 operate substantially similar.

Silver tunnel 502 and gold tunnel 504 are intended to represent two tiers of service for an application such as XML, through WAN/LAN 120. In this example, the two tiers of service may employ two different paths, or service levels within a network, such as an MPLS network. Application data that client 102 desires to be routed through gold tunnel 504 include a <service-level> XML tag in an application packet flow with a value of "Gold." Application data that client 102 desires to be routed through silver tunnel 502 include a <service-level> XML tag in the application packet flow with a value of "Silver."

As STMD 204 receives a packet (block 402 of FIG. 4), it makes a determination whether a tunnel has already been determined for the packet flow with which this packet is associated (see decision block 404 of FIG. 4). If there is no persistence based on a prior determination, data from the packet is buffered and inspected at a deep packet level (see blocks 406-408 of FIG. 4). Deep packet inspections for XML tags may include inspections at the application layer (layer seven of the OSI layered protocol).

Because the flow criteria of an XML tag may span more than the current packet, data from several packets may be buffered and inspected, as described above in blocks 410 and 414 of FIG. 4. If it is determined that the buffered data satisfies the flow criteria, an MPLS tunnel label may be associated with the packet, such that the packet can be forwarded towards the appropriate tunnel (see blocks 414-416 of FIG. 4).

The above specification, examples, and data provide a complete description of the manufacture and use of the composition of the invention. Since many embodiments of the invention can be made without departing from the spirit and scope of the invention, the invention resides in the claims hereinafter appended.

I claim:

1. An apparatus for directing a packet to a tunnel in a network, comprising:
   (a) a transceiver arranged to receive and forward each packet in a flow of packets; and
   (b) a processor, coupled to the transceiver, that is arranged to perform actions, including:
      receiving the packets from a network device;
      extracting data from the packets, wherein the extraction comprises a deep packet inspection at multiple layers of the seven layers in an Open Systems Interconnection (OSI) layered protocol across data extracted from a plurality of the packets to provide a rule syntax for at least one symbolic variable that is employed to generate a flow criteria for selecting a tunnel from a plurality of different tunnels, wherein the at least one symbolic variable includes Transmission Control Protocol (TCP) data content and one or more of a client address, server address, client port, server port, or Hypertext Transfer Protocol (HTTP) content;
      buffering a defined amount of data from the plurality of packets to determine whether the flow criteria is satisfied, wherein the defined amount is based on a number of packets required to identify the flow criteria, and wherein the number of packets is selectable based on a request to access the at least one symbolic variable;
      when the flow criteria is unsatisfied by the defined amount of buffered data, selecting the tunnel from the plurality of different tunnels based on the flow criteria being unsatisfied;
      when the flow criteria is satisfied by the defined amount of buffered data, selecting the tunnel from the plurality of different tunnels based in part on the extracted data, wherein the selected tunnel is pre-designated for a tunneling protocol that is associated with the extracted data;
      associating the packets with the selected tunnel, wherein the selected tunnel further comprises at least one of an MPLS tunnel, an IPSec tunnel, a SOCKS tunnel, a secure tunnel, and a load-balanced tunnel; and
      forwarding the packets towards the selected tunnel.

2. The apparatus of claim 1, wherein the extracted data further comprises data associated with a pre-determined application.

3. The apparatus of claim 1, wherein the extracted data further comprises a Session Initiation Protocol (SIP) header.

4. The apparatus of claim 1, wherein the extracted data further comprises SSL protocol data.

5. The apparatus of claim 1, wherein the extracted data further comprises an HTTP header.

6. The apparatus of claim 1, wherein the extracted data further comprises an XML tag.

7. The apparatus of claim 1, wherein buffering the defined amount of data is further based on the flow criteria seeking specific data content from the packets.

8. The apparatus of claim 1, wherein selecting the tunnel further comprises determining the tunnel from a plurality of tunnels based in part on a load-balancing mechanism.

9. The apparatus of claim 1, wherein associating the packets with the selected tunnel further comprises labeling the packet with an MPLS label.

10. The apparatus of claim 1, wherein associating the packets with the selected tunnel further comprises encapsulating at least a portion of the packets.

11. The apparatus of claim 1, wherein associating the packets with the selected tunnel further comprises sending a SOCKetS (SOCKS) proxy request.

12. An apparatus for directing a packet to a tunnel in a network, comprising:
    (a) a transceiver arranged to receive and forward each packet in a flow of packets; and
    (b) a processor, coupled to the transceiver, that is arranged to perform actions, including:
       receiving the packets from a network device;
       extracting data from the packets, wherein the extraction comprises:
          a deep packet inspection of multiple layers of the seven layers in an Open Systems Interconnection (OSI) layered protocol to provide a rule syntax for at least one symbolic variable that is employed to generate a flow criteria for selecting a tunnel from a plurality of different tunnels based on the extracted data from the packets, wherein the at least one symbolic variable includes Transmission Control Protocol (TCP) data content and one or more of a client address, server address, client port, server port, or Hypertext Transfer Protocol (HTTP) content;
       buffering a defined amount of data from the packets to determine whether the flow criteria is satisfied, wherein the defined amount is based on a number of packets required to identify the flow criteria, and wherein the number of packets is selectable based on a request to access the at least one symbolic variable;
       when the flow criteria is unsatisfied by the defined amount of buffered data, selecting the tunnel from the plurality of different tunnels based on the flow criteria being unsatisfied;
       when the flow criteria is satisfied by the defined amount of buffered data, selecting the tunnel from the plurality of different tunnels based in part on the extracted data, wherein the selected tunnel is pre-designated for a tunneling protocol that is associated with the extracted data;
       associating the packet with the selected tunnel, wherein the selected tunnel further comprises at least one of an MPLS tunnel, an IPSec tunnel, a SOCKS tunnel, a secure tunnel, and a load-balanced tunnel; and
       forwarding the packet towards the selected tunnel.

13. The apparatus of claim 12, wherein the extracted data further comprises data from a first layer of the OSI layered protocol and a second layer of the OSI layered protocol of the packets.

14. The apparatus of claim 12, wherein the multiple layers further comprises deep packet inspection of data from layer seven, an application layer, of the OSI layered protocol.

15. An apparatus for directing a packet to a tunnel in a network, comprising:
 (a) a transceiver arranged to receive and forward each packet in a flow of packets; and
 (b) a processor, coupled to the transceiver, that is arranged to perform actions, including:
  receiving the packet from a network device;
  extracting data from the packet, wherein the extraction comprises:
   a deep packet inspection of multiple layers of the seven layers in an Open Systems Interconnection (OSI) layered protocol to provide a rule syntax for at least one symbolic variable that is employed to generate a flow criteria for selecting a tunnel from a plurality of different tunnels, wherein the at least one symbolic variable includes Transmission Control Protocol (TCP) data content and one or more of a client address, server address, client port, server port, or Hypertext Transfer Protocol (HTTP) content;
  buffering a defined amount of data from the packets to determine whether the flow criteria is satisfied, wherein the defined amount is based on a number of packets required to identify the flow criteria, and wherein the number of packets is selectable based on a request to access the at least one symbolic variable;
  when the flow criteria is unsatisfied by the defined amount of buffered data, selecting the tunnel from the plurality of different tunnels based on the flow criteria being unsatisfied;
  when the flow criteria is satisfied by the defined amount of buffered data, selecting the tunnel from the plurality of different tunnels based in part on the extracted data, wherein the selected tunnel is pre-designated for a tunneling protocol that is associated with the extracted data;
  associating the packet with the selected tunnel, wherein the selected tunnel further comprises at least one of an MPLS tunnel, an IPSec tunnel, a SOCKS tunnel, a secure tunnel, and a load-balanced tunnel; and
  forwarding the packet towards the selected tunnel.

16. The apparatus of claim 15, wherein the extraction further comprises the deep packet inspection of data from at least layer seven and of data from at least one other layer of the OSI layered protocol.

17. The apparatus of claim 15, wherein the extracted data further comprises data associated with a pre-determined application.

18. A method for directing a packet towards a tunnel in a network, wherein a network device is arranged to perform actions, comprising:
 receiving the packet from a network device;
 buffering the received packet, wherein buffering the received packet further comprises buffering a number of packets based on the number of packets required to identify a flow criteria, wherein the number of packets is selectable based on a request to access at least one symbolic variable;
 extracting data from the buffered packet, wherein the extraction comprises performing a deep packet inspection at multiple layers of the seven layers in an Open Systems Interconnection (OSI) layered protocol to provide a rule syntax for the at least one symbolic variable that is employed to generate a flow criteria for selecting a tunnel from a plurality of different tunnels, wherein the at least one symbolic variable includes Transmission Control Protocol (TCP) data content and one or more of a client address, server address, client port, server port, or Hypertext Transfer Protocol (HTTP) content;
 selecting the tunnel from the plurality of different tunnels based in part on the extracted data, wherein the selected tunnel is pre-designated for a tunneling protocol that is associated with the extracted data, and wherein the selected tunnel further comprises at least one of an MPLS tunnel, or a secure tunnel;
 modifying the packet for the selected tunnel; and
 forwarding the modified packet towards the selected tunnel.

19. The method of claim 18, wherein the extracted data further comprises data associated with a pre-determined application.

20. The method of claim 18, wherein the extracted data further comprises an XML tag.

21. The method of claim 18, wherein the extracted data further comprises an HTTP header.

22. The method of claim 18, wherein the extracted data further comprises SSL protocol data.

23. The method of claim 18, wherein the extracted data further comprises a Session Initiation Protocol (SIP) header.

24. The method of claim 18, wherein selecting the tunnel further comprises determining the tunnel from a plurality of tunnels based in part on a load-balancing mechanism.

25. The method of claim 18, wherein selecting the tunnel further comprises determining the tunnel from a plurality of tunnels based in part on the flow criteria being unsatisfied.

26. The method of claim 18, wherein modifying the packet for the selected tunnel further comprises at least one of labeling the packet with a Multiprotocol Label Switching (MPLS) label, encapsulating at least a portion of the packet, and associating the packet with a SOCKetS (SOCKS) connection.

27. The method of claim 18, wherein the method is operable in at least one a load-balancer, a router, a firewall, a proxy, a bridge and a network address translation device.

28. The method of claim 18, further comprising:
 determining when the data satisfies at least one flow criterion, and if the flow criteria is un-satisfied, buffering another packet in the plurality of packets, and extracting another data from the other packet.

29. The method of claim 18, wherein performing a deep packet inspection further comprising evaluating the extracted data against at least one flow criterion.

30. A method for directing a packet towards a tunnel in a network, wherein a network device is arranged to perform actions, comprising:
 receiving packets from another network device;
 determining a number of packets to buffer based on a defined number of packets required to determine whether a flow criteria is satisfied, wherein the defined number of packets includes more than one packet and is selectable based on a request to access at least one symbolic variable;
 buffering the determined number of packets;
 extracting data from within the determined number of buffered packets, wherein the extraction comprises performing a deep packet inspection of multiple layers of the seven layers in an Open Systems Interconnection (OSI) layered protocol for specific application layer data content to provide a rule syntax for the at least one symbolic variable that is employed to generate the flow criteria for selecting a tunnel from a plurality of different tunnels, wherein the at least one symbolic variable includes Transmission Control Protocol (TCP)

data content and one or more of a client address, server address, client port, server port, or Hypertext Transfer Protocol (HTTP) content;

when the flow criteria is unsatisfied in the determined number of buffered packets, selecting the tunnel from the plurality of different tunnels based on the flow criteria being unsatisfied;

when the flow criteria is satisfied in the determined number of buffered packets, selecting the tunnel from the plurality of different tunnels based in part on the extracted data, wherein the selected tunnel is pre-designated for a tunneling protocol that is associated with the extracted data;

modifying the packets for the selected tunnel, wherein the selected tunnel further comprises at least one of an MPLS tunnel, an IPSec tunnel, a SOCKS tunnel, a secure tunnel, and a load-balanced tunnel; and forwarding the modified packets towards the selected tunnel.

31. The method of claim 30, wherein the multiple layers further comprises layer seven, an application layer, of the OSI layered protocol.

32. The method of claim 30, wherein extracting data further comprises extracting data from at least two layers of the OSI layered protocol of the packet.

33. A system for directing a packet towards a tunnel in a network, comprising:

a router, configured to receive a packet and to route the packet; and a tunnel manager, in communication with the router, that is configured to perform actions, comprising:

receiving packets from a network device;

determining a number of packets to buffer based on a defined number of packets required to determine whether a flow criteria is satisfied, wherein the defined number of packets includes more than one packet and is selectable based on a request to access at least one symbolic variable;

buffering the determined number of packets;

extracting data from within the determined number of buffered packets;

performing a deep packet inspection on the extracted data, wherein the deep packet inspection comprises examining data from multiple layers of the seven layers of the OSI layered protocol for specific application layer data content to provide a rule syntax for the at least one symbolic variable that is employed to generate the flow criteria for selecting a tunnel from a plurality of different tunnels, wherein the at least one symbolic variable includes Transmission Control Protocol (TCP) data content and one or more of a client address, server address, client port, server port, or Hypertext Transfer Protocol (TCP) content;

when the flow criteria is unsatisfied by the extracted data, selecting the tunnel from the plurality of different tunnels based on the flow criteria being unsatisfied;

when the extracted data satisfies the flow criteria, selecting the tunnel from the plurality of different tunnels based in part on the satisfied flow criteria, wherein the selected tunnel is pre-designated for a tunneling protocol that is associated with the extracted data, and wherein the selected tunnel further comprises at least one of an MPLS tunnel, or a secure tunnel;

modifying the packets for the selected tunnel, and forwarding the modified packets to the router, wherein the router is configured to route the packets towards the selected tunnel.

34. The system of claim 33, wherein the extracted data further comprises data associated with a pre-determined application.

35. The system of claim 33, wherein the extracted data further comprises an XML tag.

36. The system of claim 33, wherein the extracted data further comprises an HTTP header.

37. The system of claim 33, wherein the extracted data further comprises SSL protocol data.

38. The system of claim 33, wherein modifying the packet for the selected tunnel further comprises at least one of labeling the packet with an MPLS label, encapsulating at least a portion of the packet, and associating the packet with a SOCKetS (SOCKS) connection.

39. The system of claim 33, wherein the tunnel manager is further configured to operate as at least one of a load-balancer, a router, a firewall, a proxy, a bridge and a network address translation device.

40. A system for directing a packet towards a tunnel in a network, comprising:

a router, configured to receive a packet and to route the packet; and a tunnel manager, in communication with the router, that is configured to perform actions, comprising:

receiving packets from a network device;

determining a number of packets to buffer based on a defined number of packets required to determine whether a flow criteria is satisfied, wherein the defined number of packets includes more than one packet and is selectable based on a request to access at least one symbolic variable;

buffering the determined number of packets;

extracting data from within the determined number of buffered packets;

performing a deep packet inspection on the extracted data, wherein the deep packet inspection comprises examining data from multiple layers of the seven layers of the OSI layered protocol for specific application layer data content to provide a rule syntax for the at least one symbolic variable that is employed to generate the flow criteria for selecting a tunnel from a plurality of different tunnels, wherein the at least one symbolic variable includes Transmission Control Protocol (TCP) data content and one or more of a client address, server address, client port, server port, or Hypertext Transfer Protocol (HTTP) content;

when the flow criteria is unsatisfied by the extracted data, selecting the tunnel from the plurality of different tunnels based on the flow criteria being unsatisfied;

when the extracted data satisfies the flow criteria, selecting the tunnel from the plurality of different tunnels based in part on the satisfied flow criteria, wherein the selected tunnel is pre-designated for a tunneling protocol that is associated with the extracted data;

modifying the packets for the selected tunnel, wherein the selected tunnel further comprises at least one of an MPLS tunnel, an IPSec tunnel, a SOCKS tunnel, a secure tunnel, or a load-balanced tunnel; and forwarding the modified packets to the router, wherein the router is configured to route the packets towards the selected tunnel.

41. The system of claim 40, wherein the at least layer seven further comprises layer seven and at least one other layer above layer three of the OSI layered protocol.

42. The system of claim 40, wherein extracting data further comprises extracting data from at least two layers of the OSI layered protocol of the packet.

43. A network device for directing a packet towards a tunnel in a network, comprising:
- a receiver configured to receive packets from another network device;
- a processor that is arranged to perform actions, including:
    - buffering a defined number of packets required to determine whether a flow criteria is satisfied, wherein the defined number of packets includes more than one packet and is selectable based on a request to access the at least one symbolic variable;
    - extracting specific application layer data content from within the defined number of buffered packets using deep packet inspection at an application layer to provide a rule syntax for the at least one symbolic variable that is employed to generate the flow criteria for selecting a tunnel from a plurality of different tunnels;
    - selecting the tunnel from the plurality of different tunnels when the flow criteria is unsatisfied in the defined number of buffered packets, wherein the tunnel is selected based on the flow criteria being unsatisfied; and
    - selecting the tunnel from the plurality of different tunnels when the flow criteria is satisfied in the defined number of buffered packets, wherein the tunnel is selected based in part on the deep packet inspection at multiple layers of the seven layers in the OSI layered protocol, wherein the selected tunnel is pre-designated for a tunneling protocol that is associated with the extracted data, and wherein the selected tunnel further comprises at least one of an MPLS tunnel, an IPSec tunnel, a SOCKS tunnel, a secure tunnel, or a load-balanced tunnel, wherein the at least one symbolic variable includes Transmission Control Protocol (TCP) data content and one or more of a client address, server address, client port, server port, or Hypertext Transfer Protocol (HTTP) content; and
- a logic device that is configured to associate the packets with the selected tunnel; and
- a transmitter configured to forward the packets towards the selected tunnel.

* * * * *